United States Patent [19]

Becker et al.

[11] Patent Number: 5,107,804
[45] Date of Patent: Apr. 28, 1992

[54] VARIABLE CAMSHAFT TIMING FOR INTERNAL COMBUSTION ENGINE

[75] Inventors: Thomas J. Becker, Auburn; Roger P. Butterfield, Interlaken; Stanley K. Dembosky, Ithaca; Franklin R. Smith, Slaterville Springs, all of N.Y.

[73] Assignee: Borg-Warner Automotive Transmission & Engine Components Corporation, Sterling Heights, Mich.

[21] Appl. No.: 713,465

[22] Filed: Jun. 11, 1991

Related U.S. Application Data

[63] Continuation-in-part of Ser. No. 584,913, Sep. 19, 1990, Pat. No. 5,046,460, which is a continuation-in-part of Ser. No. 422,353, Oct. 16, 1989, Pat. No. 5,002,023.

[51] Int. Cl.$^5$ ............................................. F01L 1/34
[52] U.S. Cl. ......................... 123/90.17; 123/90.31; 464/2
[58] Field of Search ............... 123/90.12, 90.13, 90.15, 123/90.17, 90.31; 464/2

[56] References Cited

U.S. PATENT DOCUMENTS

| | | | |
|---|---|---|---|
| 4,858,572 | 8/1989 | Shirai et al. | 123/90.12 |
| 5,002,023 | 3/1991 | Butterfield et al. | 123/90.15 |
| 5,046,460 | 9/1991 | Butterfield et al. | 123/90.15 |
| 5,056,477 | 10/1991 | Linder et al. | 123/90.17 |
| 5,056,478 | 10/1991 | Ma | 123/90.17 |

Primary Examiner—E. Rollins Cross
Assistant Examiner—Weilun Lo
Attorney, Agent, or Firm—Willian Brinks Olds et al.

[57] ABSTRACT

A camshaft (426) has a vane (460) secured to an end thereof for non-oscillating rotation therewith. The camshaft also carries a sprocket (432) which can rotate with the camshaft but which is oscillatable with respect to the camshaft. The vane has opposed lobes (460a, 460b) which are received in opposed recesses (432a, 432b), respectively, of the sprocket. The recesses have greater circumferential extent than the lobes to permit the vane and sprocket to oscillate with respect to one another, and thereby permit the camshaft to change in phase relative to a crankshaft whose phase relative to the sprocket is fixed by virtue of a chain drive extending therebetween. The camshaft tends to change in reaction to pulses which it experiences during its normal operation, and it is permitted to change only in a given direction, either to advance or retard, by selectively blocking or permitting the flow of hydraulic fluid, preferably engine oil, through the return lines (494, 496) from the recesses by controlling the position of a spool (500) within a valve body (498) of a control valve in response to a signal indicative of an engine operating condition from an engine control unit (508).

22 Claims, 21 Drawing Sheets

VARIABLE CAMSHAFT TIMING FOR INTERNAL COMBUSTION ENGINE

CROSS-REFERENCE TO RELATED APPLICATIONS

This application is a continuation-in-part of application Ser. No. 584,913, now U.S. Pat. No. 5,046,460, which, in turn, is a continuation-in-part of co-pending application Ser. No. 422,353, now U.S. Pat. No. 5,002,023, the disclosures of each of which are incorporated by reference herein.

FIELD OF THE INVENTION

This invention relates to an internal combustion engine in which the timing of the camshaft of a single camshaft engine, or the timing of one or both of the camshafts of a dual camshaft engine, relative to the crankshaft is varied to improve one or more of the operating characteristics of the engine.

BACKGROUND OF THE INVENTION

It is known that the performance of an internal combustion engine can be improved by the use of dual camshafts, one to operate the intake valves of the various cylinders of the engine and the other to operate the exhaust valves. Typically, one of such camshafts is driven by the crankshaft of the engine, through a sprocket and chain drive or a belt drive, and the other of such camshafts is driven by the first, through a second sprocket and chain drive or a second belt drive. Alternatively, both of the camshafts can be driven by a single crankshaft powered chain drive or belt drive. It is also known that engine performance in an engine with dual camshafts can be further improved, in terms of idle quality, fuel economy, reduced emissions or increased torque, by changing the positional relationship of one of the camshafts, usually the camshaft which operates the intake valves of the engine, relative to the other camshaft and relative to the crankshaft, to thereby vary the timing of the engine in terms of the operation of its intake valves relative to its exhaust valves or in terms of the operation of its valves relative to the position of the crankshaft. Heretofore, such changes in engine valve timing have been accomplished by a separate hydraulic motor operated by engine lubricating oil. However, this actuating arrangement consumes significant additional energy and it increases the required size of the engine lubricating pump because of the required rapid response time for proper operation of the camshaft phasing actuator. Further, these arrangements are typically limited to a total of 20° of phase adjustment between crankshaft position and camshaft position, and typically such arrangements are two-position arrangements, that is, on, or fully phase adjusted as one position, or off, or no phase adjustment, as a second position. The present invention is designed to overcome these problems associated with prior art variable camshaft timing arrangements by providing a self-actuating, variable camshaft timing arrangement which does not require external energy for the operation thereof, which does not add to the required size of the engine lubricating pump to meet transient hydraulic operation requirements of such variable camshaft timing arrangement, which provides for continuously variable camshaft to crankshaft phase relationship within its operating limits, and which provides substantially more than 20° of phase adjustment between the crankshaft position and the camshaft position.

It is also known that the performance of an internal combustion engine having but a single camshaft can be improved by changing the positional relationship of the camshaft relative to the crankshaft. However, the known systems for phase adjusting the camshaft in a single camshaft engine also involve a separate hydraulic pump, or put a heavy demand on the engine oil pump, they are also two-position systems, and/or they are also limited to a maximum of approximately 20° of phase adjustment between crankshaft position and camshaft position.

SUMMARY OF THE INVENTION

The present invention provides a phase adjustment arrangement for an internal combustion engine in which the position of the camshaft, or the positions of one or both of the camshafts in a dual camshaft system, is phase adjusted relative to the crankshaft, that is, in which the camshaft is advanced or retarded relative to the crankshaft by an actuating arrangement which is controlled, for example, by a microprocessor, to control one or more important engine operating characteristics, such as idle quality, fuel economy, emissions, or torque.

In a first embodiment, the actuating arrangement utilizes a pair of oppositely acting hydraulic cylinders to advance or retard the angular position of a camshaft relative to the crankshaft. Hydraulic fluid, in the form of engine oil, is transferred between the oppositely acting cylinders in reaction to changes in torque loads which are experienced by a camshaft as each of its lobes changes its angle of contact with the cam follower of the valve lifter of the engine which is operated thereby. Such flow between the hydraulic cylinders is either blocked or permitted in one direction by a control valve and check valves, and the operation of the control valve is controlled by the engine control microprocessor to ensure that the advancing or retarding of the position variable camshaft only occurs when desired. Because the flow of hydraulic oil between the cylinders results from changes in torque experienced by one of the camshafts, no separate pump or other actuating device is required. Further, because the camshaft which is advanced or retarded is advanced or retarded by moving hydraulic fluid which is already within one o another of the oppositely acting cylinders to the other, this hydraulic fluid, engine oil in the preferred embodiment, does not have to flow through the main lubricating pump during the short time interval in which the phase adjustment must take place. Thus, the variable camshaft timing arrangement of this invention does not require the use of a significantly larger engine oil lubricating pump than would otherwise be required, and the actuation rate of the variable camshaft timing arrangement is not limited by the capacity of the engine oil pump.

In an alternative embodiment the actuating arrangement uses one or more radially extending vanes which are circumferentially fixed relative to the camshaft and which are received in cavities of a sprocket housing that is oscillatable on the camshaft. Hydraulic fluid is selectively pumped to one side or another of each vane to advance or retard the position of the camshaft relative to the sprocket, and the pumping action occurs in reaction to torque pulsations in the camshaft. When the sprocket is chain or belt or gear connected to the crankshaft, and/or to a second independently adjustable camshaft, the position of the camshaft can be advanced or retarded relative to the position of the crankshaft and-/or second camshaft, as the case may be, and such advancing or retarding can be continuously variable over the advance/retard range of motion of the phase adjusted camshaft.

Accordingly, it is an object of the present invention to provide an improved variable camshaft timing arrangement for an internal combustion engine. More particularly, it is an object of the present invention to provide a variable camshaft timing arrangement which is self-actuating and which does not add to the peak load pumping requirements of the engine lubricating pump. It is also an object of the present invention to provide a variable camshaft timing arrangement in which the position of a camshaft is continuously variable relative to the position of the crankshaft within its operating limits. It is also an object of the present invention to provide a hydraulically operated variable camshaft timing arrangement of somewhat simplified mechanical and hydraulic construction relative to an arrangement which uses a pair of oppositely acting, hydraulically interconnected hydraulic cylinders.

For a further understanding of the present invention and the objects thereof, attention is directed to the drawing and the following brief description thereof, to the detailed description of the preferred embodiment, and to the appended claims.

DETAILED DESCRIPTION OF THE PREFERRED EMBODIMENT

Figure 1A:
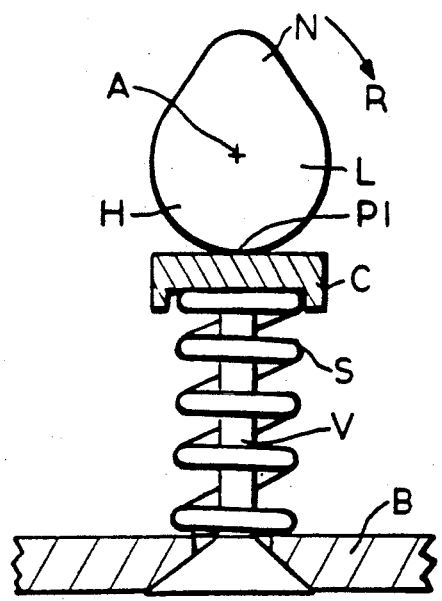
FIGS. 1A through 1D are schematic views illustrating the contact between a lobe of a camshaft and a cam follower of an engine valve at various times during a complete rotation of the camshaft.

FIGS. 1A through 1D illustrate the interaction which occurs in an operating internal combustion engine between a camshaft lobe L and a contactor C of a valve V during the rotation of the lobe L, illustratively in a clockwise direction as indicated by the arrow R, as the contactor C is urged against the lobe L by a spring S which is trapped between the contact C and the engine block B. The lobe L has a semicircular heel portion H and a protruding nose portion N. When the contact between the contactor C and the lobe L occurs at a point Pl on the heel portion H of the lobe L, the force exerted on the lobe L by the contactor C and the spring S which urges it against the lobe L will act along a line through the axis of rotation A of the lobe L and in the direction of movement of the valve V, and will result in no torque load being imposed on the camshaft. This condition is illustrated in FIG. 1A.

Figure 1B:
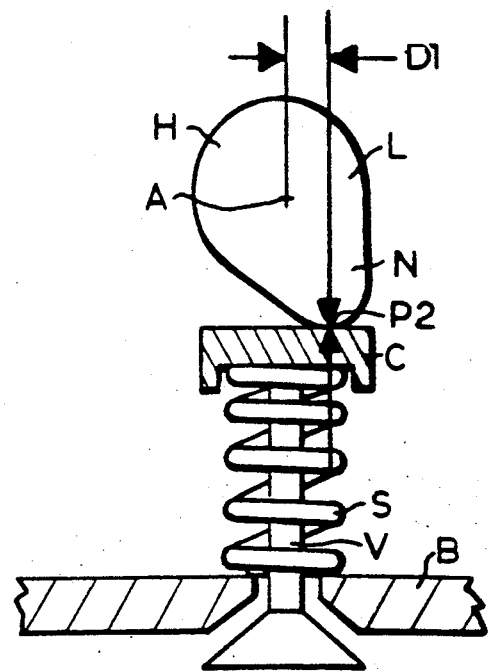
Figure 1C:
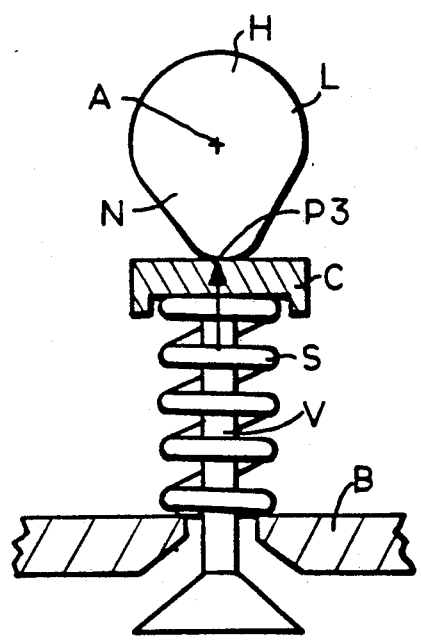
Figure 1D:
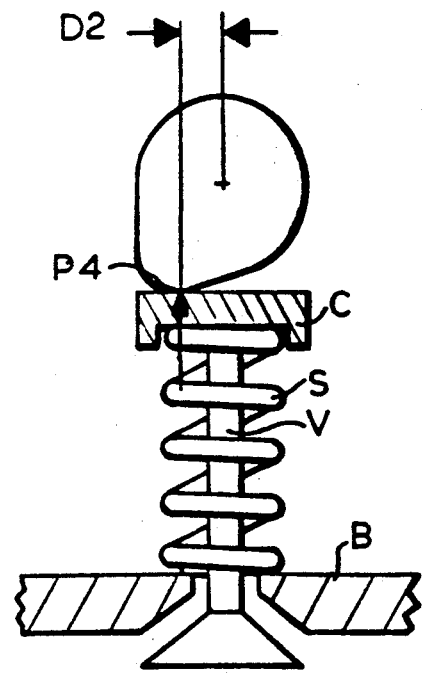
Figure 2:
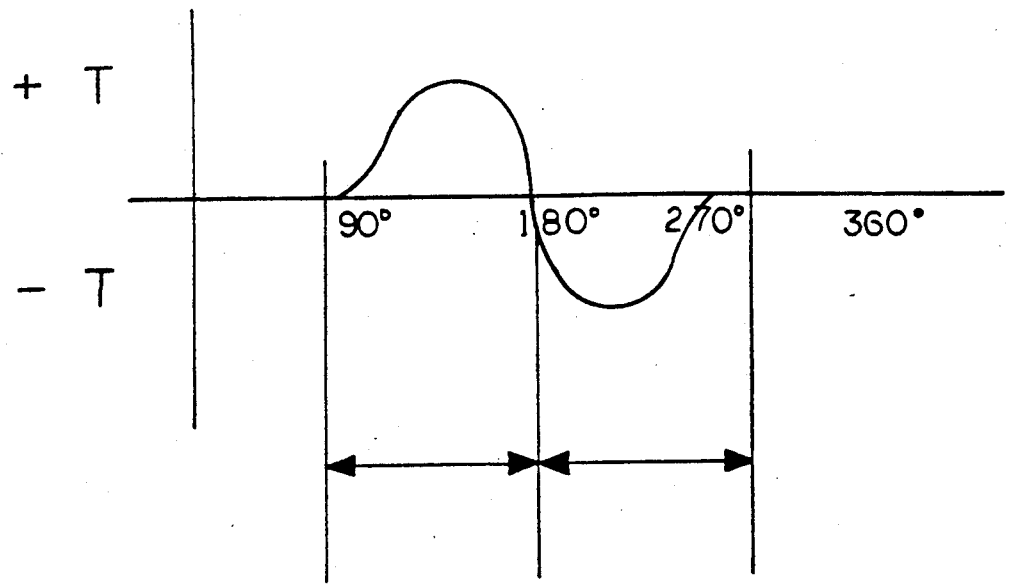
FIG. 2 is a graph which illustrates the changes in torque experienced by a camshaft as a result of changes in the contact between a lobe of the camshaft and a cam follower of an engine valve, of the type illustrated in FIGS. 1A through 1D.

As the rotation of the lobe L continues in the clockwise direction from the position illustrated in FIG. 1A, eventually the nose N of the lobe L will contact the contactor C at a point P2 on the nose portion N. The point P2 is offset in a given direction from the line through the axis of rotation A and the direction of movement of the valve V by a distance D1, as is illustrated in FIG. 1B. At this position of the lobe L a torque will be imposed on the camshaft equal to the magnitude of a force F1 which acts on the contactor C as a result of the spring S multiplied by the distance D1. Eventually, during the further rotation of the lobe L and as is illustrated in FIG. 1D, the nose portion N of the lobe L will contact the contactor C at a point P4 which is on the opposite side of the axis of rotation A from the point P2 and which is spaced from the line through the axis of rotation A in the direction of movement of the valve V by a distance D2. At this position of the lobe L a torque will be imposed on the camshaft equal to the magnitude of a force F2 which acts on the contactor C multiplied by the distance D2, which will be a negative amount in relation to the distance D1. Thus, the camshaft torque in the FIG. 1D position of the lobe L is oppositely directed with respect to the camshaft torque in the FIG. 1B position. As the lobe L moves from the FIG. 1B position to the FIG. 1D position it will pass through the FIG. 1C position in which there will be zero torque on the camshaft because the nose portion N of the lobe L will contact the contactor at a point P3 which is aligned with the direction of movement of the valve V and the axis of rotation A of the camshaft. The variation in the torque experienced by the camshaft which carries a lobe as it rotates through a complete 360° cycle is illustrated by the curve in FIG. 2 in which the horizontal axis represents the angle of rotation, in degrees, and the vertical axis represents torque. This curve, assuming negligible friction, which is a substantially valid assumption for an engine having roller followers, approximates a sine curve.

The variations in torque which are experienced by a camshaft in turning through each of its 360° cycles, and which are illustrated in FIGS. 1A-1D and 2, are utilized as an actuating force to actuate a variable camshaft timing arrangement in the systems of FIGS. 3-29. In the arrangement of FIGS. 3-14, a crankshaft 22 has a sprocket 24 keyed thereto, and rotation of the crankshaft 22 during the operation of the engine in which it is incorporated, otherwise not shown, is transmitted to an exhaust camshaft 26, that is, a camshaft which is used to operate the exhaust valves of the engine, by a chain 28 which is trained around the sprocket 24 and a sprocket 30 which is keyed to the camshaft 26. Although not shown, it is to be understood that suitable chain tighteners will be provided to ensure that the chain 28 is kept tight and relatively free of slack. As shown, the sprocket 30 is twice as large as the sprocket 24. This relationship results in a rotation of the camshaft 26 at a rate of one-half that of the crankshaft 22, which is proper for a 4-cycle engine. It is to be understood that the use of a belt in place of the chain 28 is also contemplated.

Figure 6:
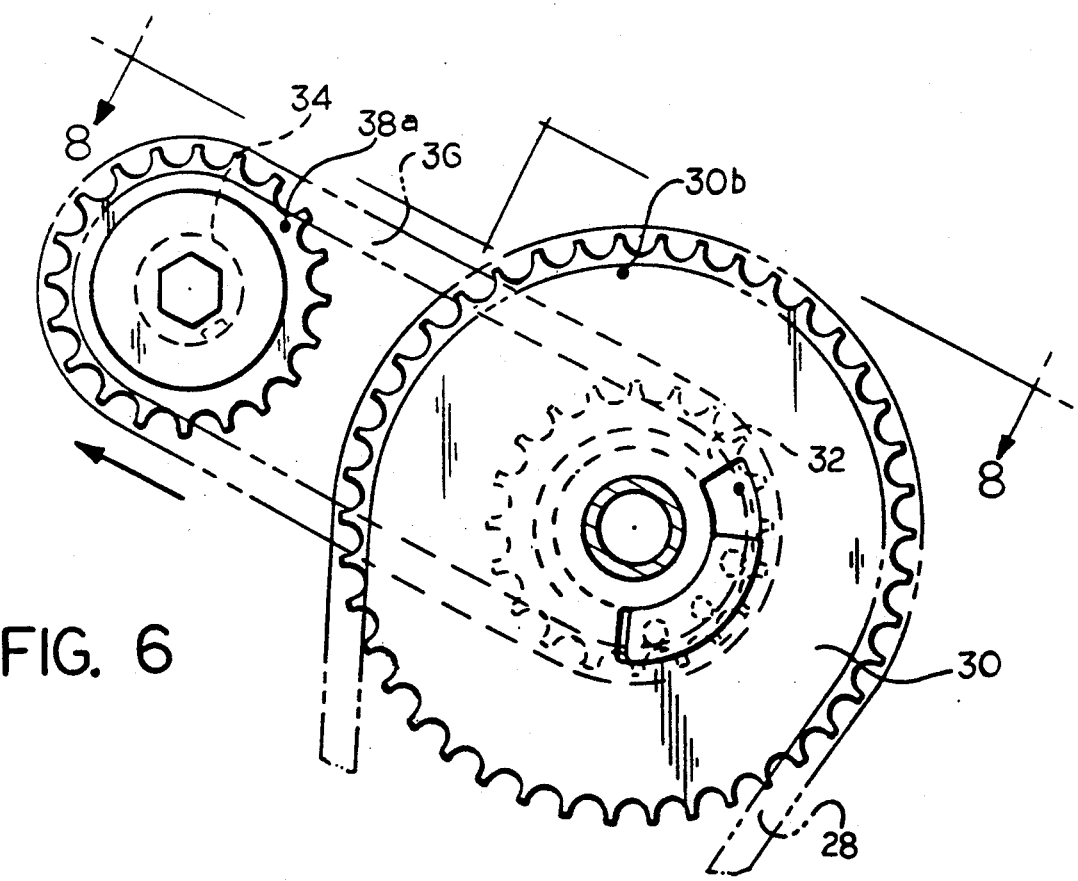
FIG. 6 is a fragmentary view similar to FIG. 5 showing the intake camshaft in an advanced position relative to the exhaust camshaft.
Figure 5:
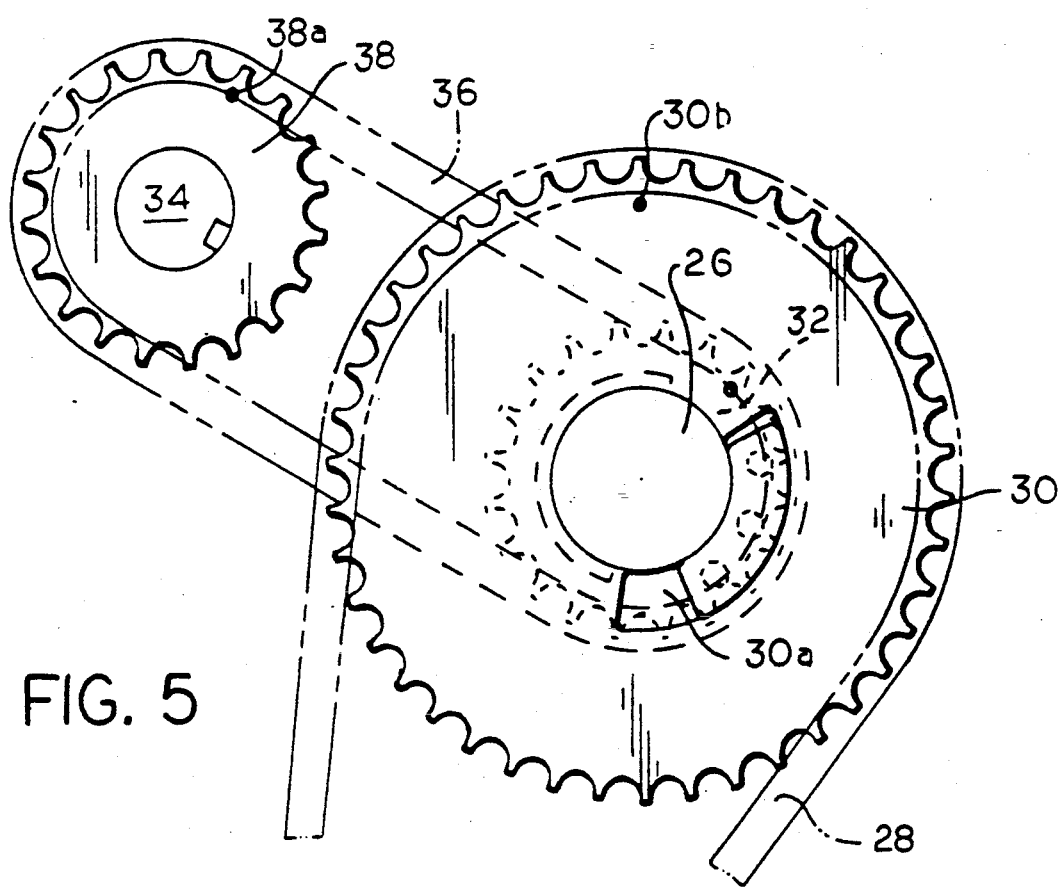
FIG. 5 is a fragmentary view taken on line 5—5 of FIG. 8 with some of the structure being removed for the sake of clarity and being shown in the retarded position of the device.
Figure 7:
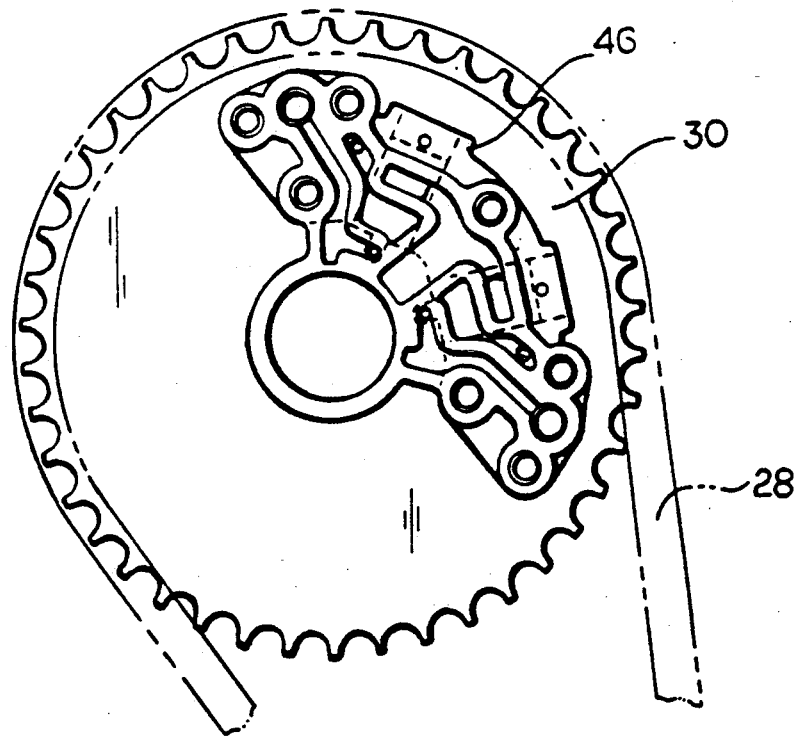
FIG. 7 is a fragmentary view showing the reverse side of some of the structure illustrated in FIG. 3.
Figure 9:
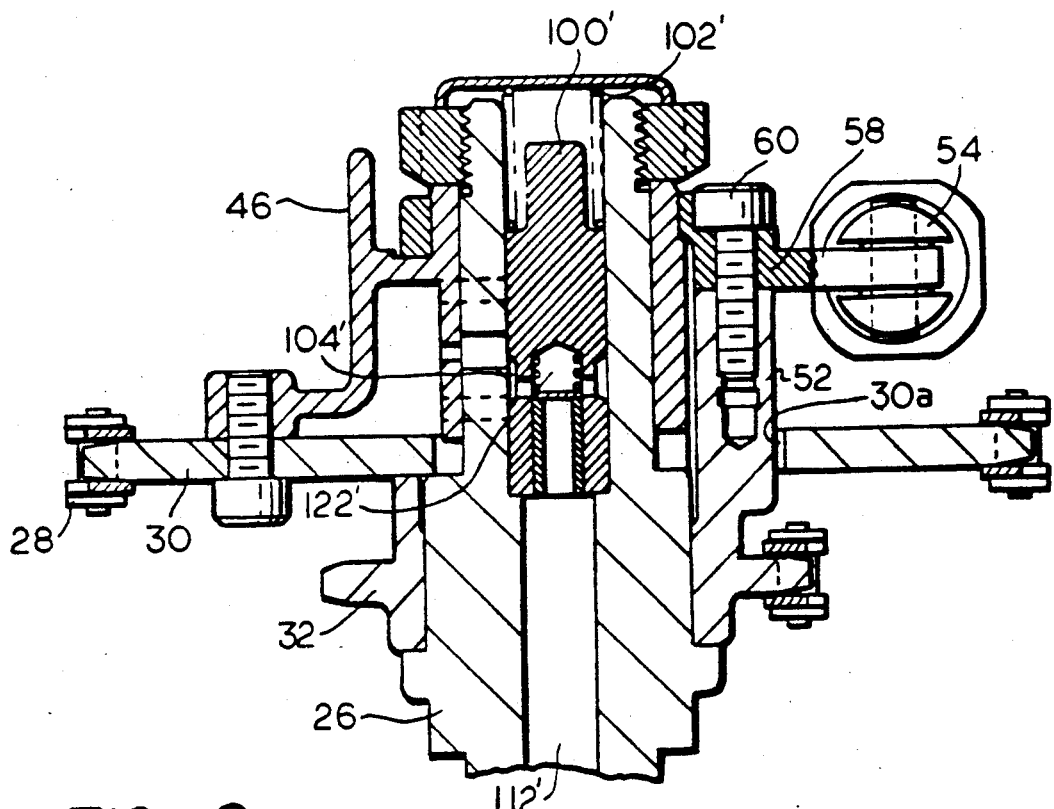
FIG. 9 is a fragmentary view taken on line 9—9 of FIG. 3.
Figure 10:
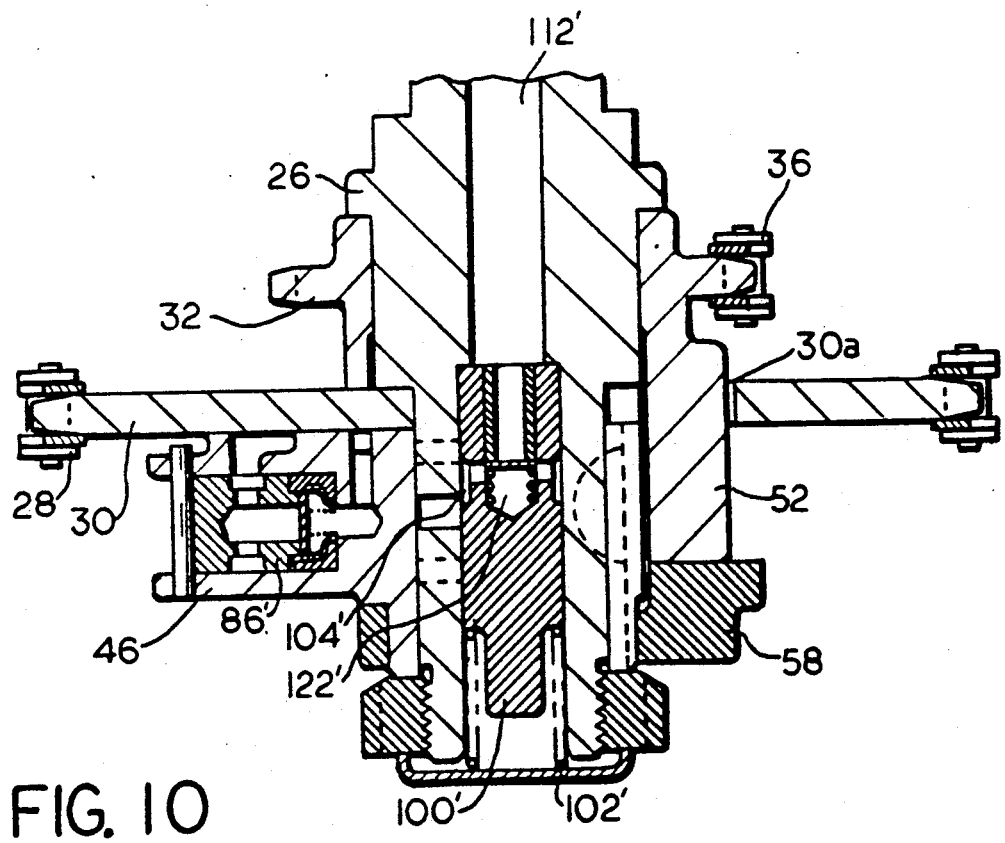
FIG. 10 is a sectional view taken on line 10—10 of FIG. 3.
Figure 11:
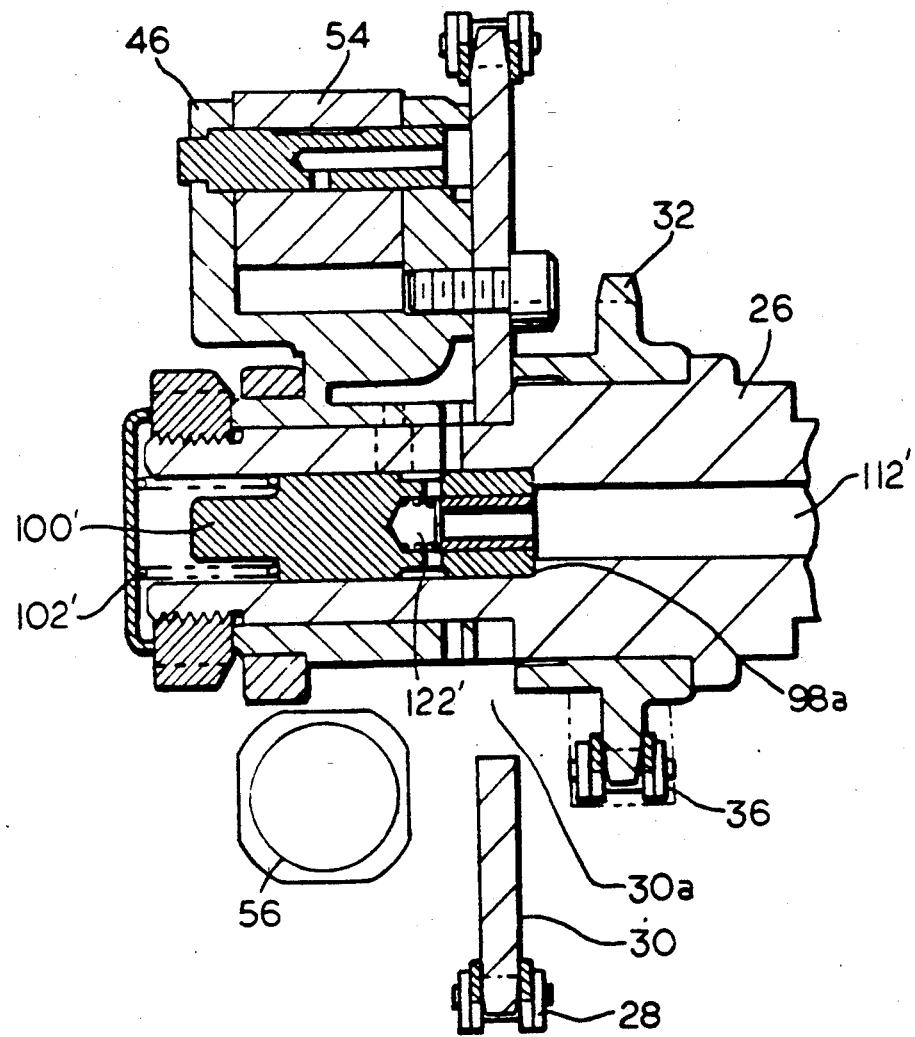
FIG. 11 is a sectional view taken on line 11—11 of FIG. 3.

The camshaft 26 carries another sprocket, namely sprocket 32, FIG. 5 and 6, journalled thereon to be oscillatable through a limited arc with respect thereto and to be otherwise rotatable with the camshaft 26. Rotation of the camshaft 26 is transmitted to an intake camshaft 34 by a chain 36 which is trained around the sprocket 32 and a sprocket 38 that is keyed to the intake camshaft 34. As shown, the sprockets 32 and 38 are equal in diameter to provide for equivalent rates of rotation between the camshaft 26 and the camshaft 34. The use of a belt in place of the chain 36 is also contemplated.

Figure 8:
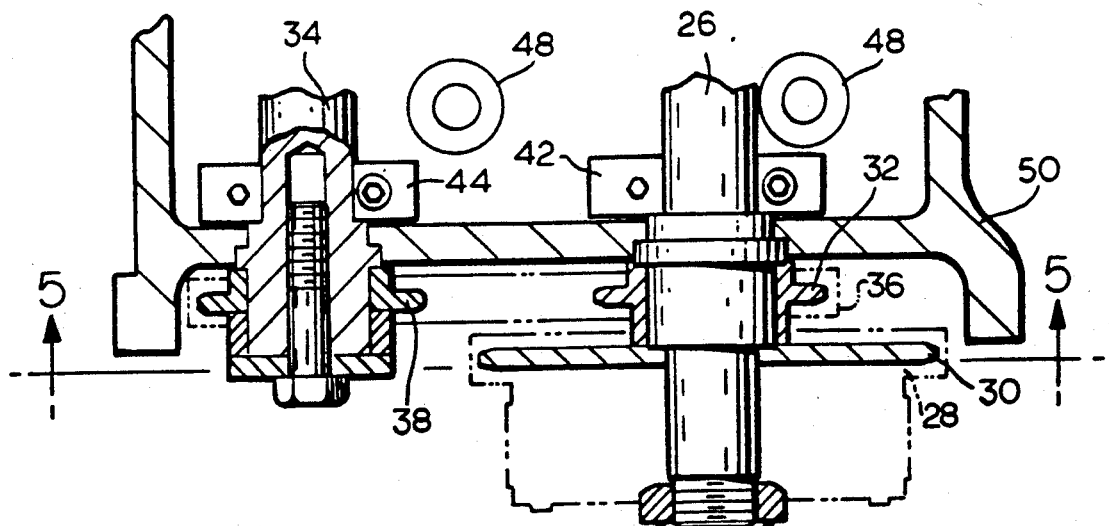
FIG. 8 is a fragmentary view taken on line 8—8 of FIG. 6.

As is illustrated in FIG. 8, an end of each of the camshafts 26 and 34 is journalled for rotation in bearings 42 and 44, respectively, of the head 50, which is shown fragmentarily and which is bolted to an engine block, otherwise not shown, by bolts 48. The opposite ends of the camshafts 26 and 34, not shown, are similarly journalled for rotation in an opposite end, also not shown, of the head 50. The sprocket 38 is keyed to the camshaft 34 at a location of the camshaft 34 which is outwardly of the head 50. Similarly, the sprockets 32 and 30 are positioned, in series, on the camshaft 26 at locations outwardly of the head 50, the sprocket 32 being transversely aligned with the sprocket 38 and the sprocket 30 being positioned slightly outwardly of the sprocket 32, to be transversely aligned with the sprocket 24.

Figure 3:
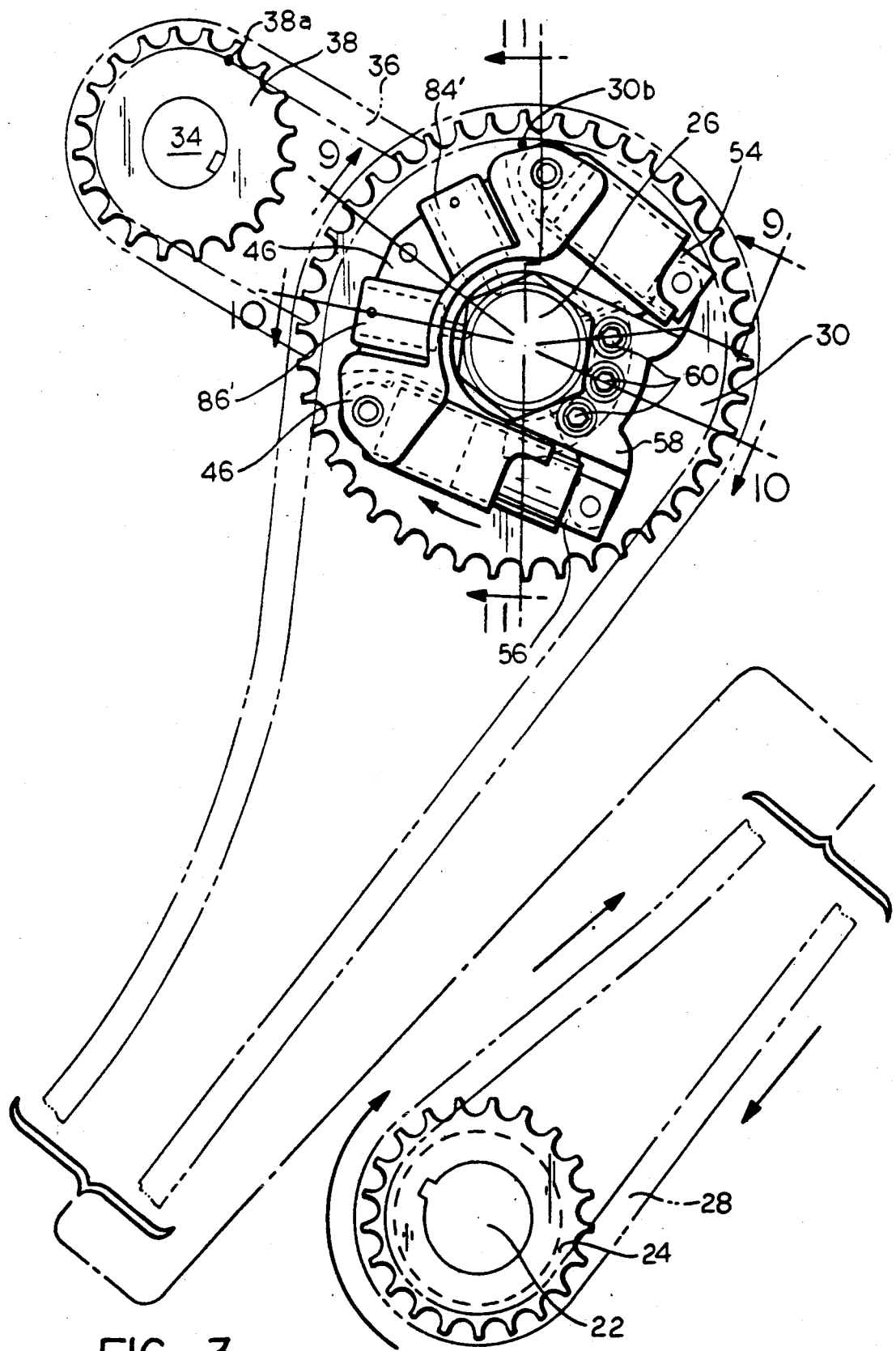
FIG. 3 is a fragmentary view of a dual camshaft internal combustion engine incorporating an embodiment of a variable camshaft timing arrangement according to the present invention, the view being taken on a plane extending transversely through the crankshaft and the camshafts and showing the intake camshaft in a retarded position relative to the crankshaft and the exhaust camshaft.
Figure 4:
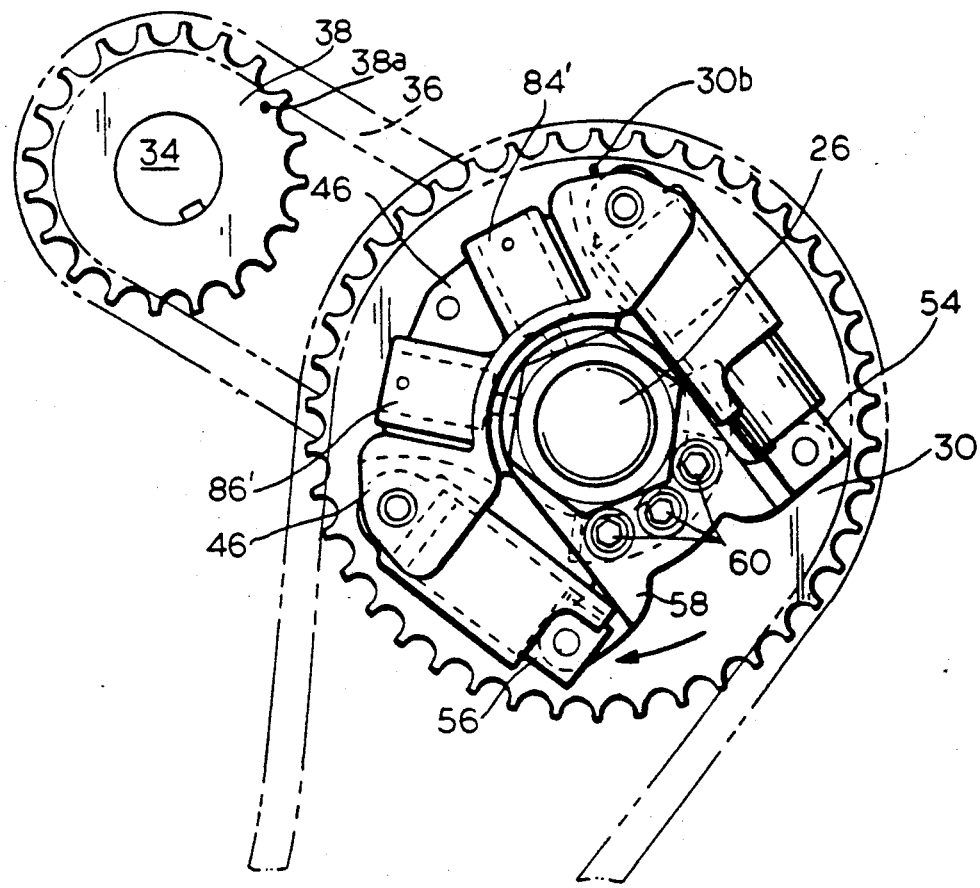
FIG. 4 is a fragmentary view similar to a portion of FIG. 3 showing the intake camshaft in an advanced position relative to the exhaust camshaft.
Figure 12:
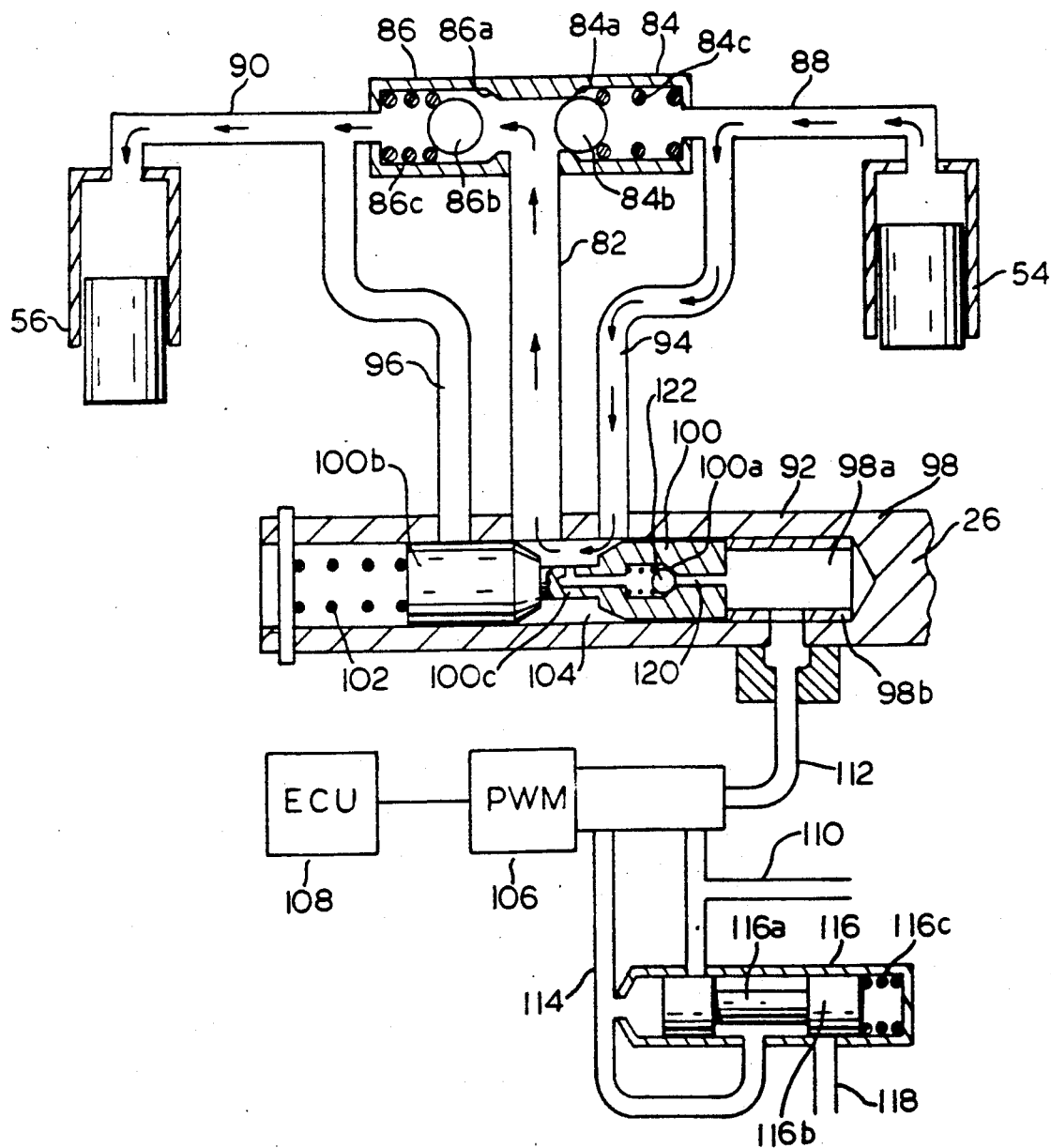
FIG. 12 is a schematic view of the hydraulic equipment of the variable camshaft timing arrangement according to the preferred embodiment and illustrates a condition where the camshaft phase is shifting in the direction of the retarded position of the arrangement which is illustrated in FIG. 3.
Figure 13:
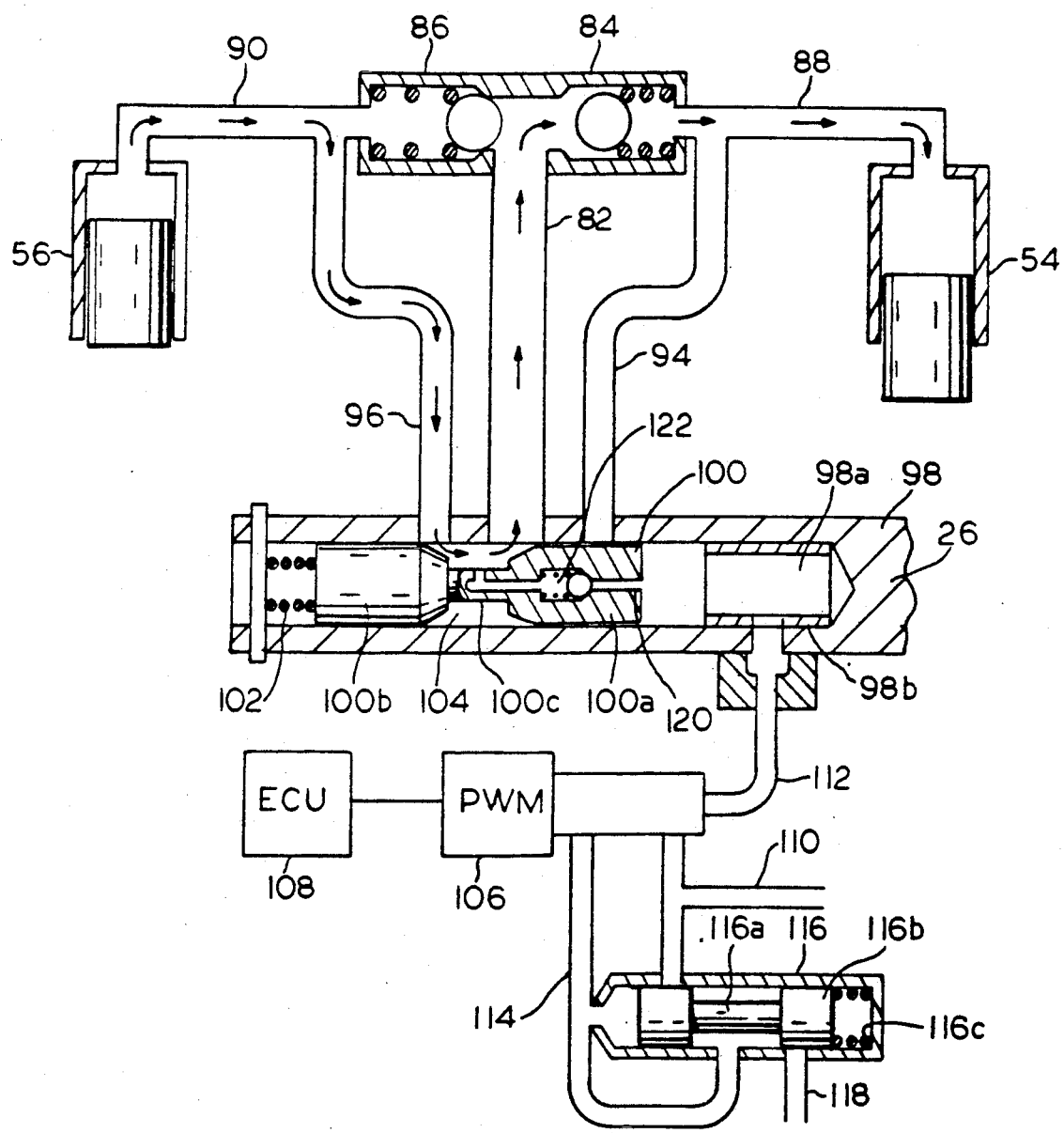
FIG. 13 is a schematic view similar to FIG. 12 and illustrates a condition where the camshaft is shifting in the direction of the advanced position of the variable camshaft timing arrangement which is illustrated in FIG. 4.
Figure 14:
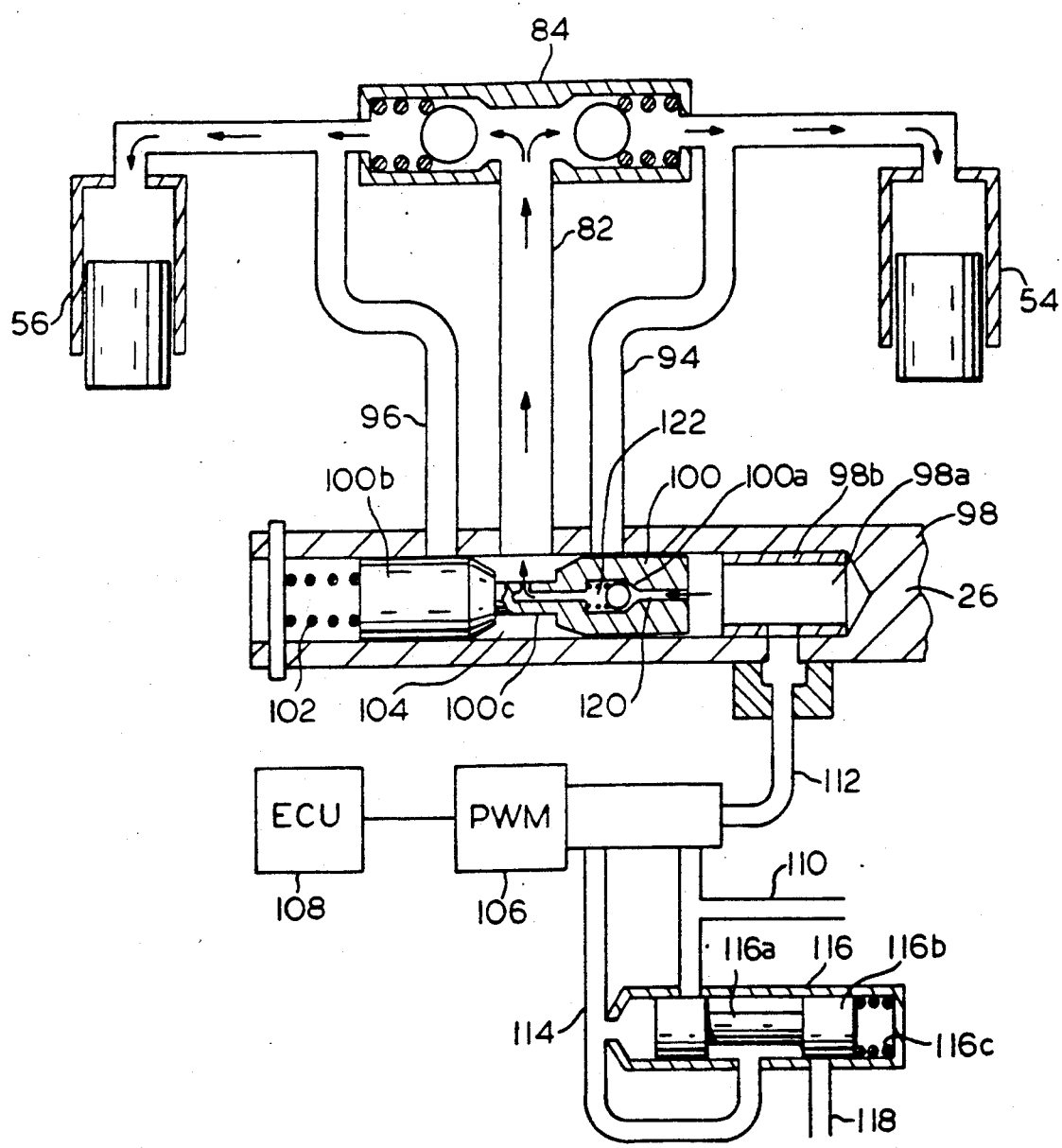
FIG. 14 is a schematic view similar to FIGS. 12 and 13 and illustrates a condition where the camshaft phase is being maintained in a position between the advanced position and the retarded position of the variable camshaft timing arrangement of the present invention.

The sprocket 32 has an arcuate retainer 52 (FIG. 10) as an integral part thereof, and the retainer 52 extends outwardly from the sprocket 32 through a arcuate opening 30a in the sprocket 30. The sprocket 30 has an arcuate hydraulic body 46 bolted thereto and the hydraulic body 46, which houses certain of the hydraulic components that are illustrated in FIGS. 12-14, receives and pivotably supports the body end of each of a pair of oppositely acting, single acting hydraulic cylinders 54 and 56 which are positioned on opposite sides of the longitudinal axis of the camshaft 26. The piston ends of the cylinders 54 and 56 are pivotally attached to an arcuate bracket 58, and the bracket 58 is secured to the sprocket 32 by a plurality of threaded fasteners 60. Thus, by extending one of the cylinders 54 and 56 and by simultaneously retracting the other of the cylinders 54 and 56, the arcuate position of the sprocket 32 will be changed relative to the sprocket 30, either to advance the sprocket 32 if the cylinder 54 is extended and the cylinder 56 is retracted, which is the operating condition illustrated in FIGS. 4, 6, and 13, or to retard the sprocket 32 relative to the sprocket 30 if the cylinder 56 is extended and the cylinder 54 is retracted, which is the operating condition illustrated in FIGS. 3, 5, 9, 10 and 12. In either case, the retarding or advancing of the position of the sprocket 32 relative to the position of the sprocket 30 will advance or retard the position of the camshaft 34 relative to the position of the camshaft 26 by virtue of the chain drive connection provided by the chain 36 between the sprocket 32, which is journalled for limited relative arcuate movement on the camshaft 26, and the sprocket 38, which is keyed to the camshaft 34. This relationship can be seen in the drawing by comparing the relative position of a timing mark 30b on the sprocket 30 and a timing mark 38a on the sprocket 38 in the retard position of the camshaft 34, as is shown in FIGS. 3 and 5, to their relative positions in the advanced position of the camshaft 34, as is shown in FIGS. 4 and 6.

The flow of hydraulic fluid, which is in the form of engine lubricating oil, into and out of the cylinders 54 and 56 is schematically illustrated in FIGS. 12-14, in which the cylinders 54 and 56 receive fluid by way of a common inlet line 82. The inlet line 82 terminates at a juncture between opposed check valves 84 and 86 which are connected to the cylinders 54 and 56, respectively, by branch lines 88 and 90, respectively. The check valves 84 and 86 have annular seats 84a and 86a to permit the flow of hydraulic fluid through the check valves 84 and 86 into the cylinders 54 and 56, respectively. The flow of hydraulic fluid through the check valves 84 and 86 is blocked by floating balls 84b and 86b, respectively, which are resiliently urged against the seats 84a and 86a, respectively, by springs 84c and 86c, respectively. The check valves 84 and 86, thus, permit the initial filling of the cylinders 54 and 56 and provide for a continuous supply of make-up hydraulic fluid to compensate for leakage therefrom. Hydraulic fluid enters the line 82 by way of a spool valve 92, which is incorporated within the camshaft 26 in the embodiment of FIGS. 3-11, and hydraulic fluid is returned to the spool valve 92 from the cylinders 54 and 56 by return lines 94 and 96, respectively.

The spool valve 92 is made up of a cylindrical member 98 and a spool 100 which is slidable to and fro within the member 98. The spool 100 has cylindrical lands 100a and 100b on opposed ends thereof, and the lands 100a and 100b, which fit snugly within the member 98, are positioned so that the land 100b will block the exit of hydraulic fluid from the return line 96, as is shown in FIG. 12, where the camshaft 34 is shifting in the direction of its retarded position, or the land 100a will block the exit of hydraulic fluid from the return line 94, as is shown in FIG. 13, where the camshaft 34 is shifting in the direction of its advanced position, or the lands 100a and 100b will block the exit of hydraulic fluid from both the return lines 94 and 96, as is shown in FIG. 14, where the camshaft 34 is being maintained in a selected intermediate position.

The position of the spool 100 within the member 98 is influenced by a spring 102 which acts on the end of the land 100b. Thus, the spring 102 resiliently urges the spool 100 to the right, in the orientation illustrated in FIGS. 12-14. The position of the spool 100 within the member 98 is further influenced by a supply of pressurized hydraulic fluid within a portion 98a of the member 98, on the outside of the land 100a, which urges the spool 100 to the left, the movement of the spool 100 to the right being limited by a sleevelike mechanical stop 98b within the right hand end position of the cylindrical member 98. The retraction of one or another of the cylinders 54 and 56, with a resulting extension of the other of such cylinders, results from the unblocking of either the return line 94 or the return line 96, as heretofore described, since the hydraulic fluid which passes through such return line will flow into the inlet line 82 by way of an annular space 104 which is defined by the inside of the member 98 and the outside of a reduced diameter portion 100c of the spool 100, which is positioned between the lands 100a and 100b. Thus, the expansion of the expanding cylinder 54 or 56 results from a transfer of hydraulic fluid directly thereto from the contracting cylinder 56 or 54, and does not add to the required size of the engine lubricating oil pump.

The pressure within the portion 98a of the cylindrical member 98 is controlled by a pressure control signal from a controller 106, preferably of the pulse width modulated type (PWM), in response to a control signal from an electronic engine control unit (ECU) 108, shown schematically, which may be of conventional construction. The controller 106 receives engine oil from the main oil gallery of the engine through an inlet line 110 and selectively delivers engine oil from such source to the portion 98a of the cylindrical member 98 through a supply line 112. Spent oil from the controller 106 is returned by way of an outlet line 114 to a low pressure regulator valve 116, which also receives supply oil from the inlet line 110, and oil from the low pressure regulator valve 116 is returned to the engine oil sump by way of an outlet line 118. Flow through the outlet line 118 is blocked by a land 116b on a sliding spool 116a of the pressure regulator valve 116 unless the pressure in the line 114 is sufficient to overcome the biasing effect of a spring 116c. Thus, the low pressure regulator valve 116 serves to maintain a minimum oil pressure, for example, 15 p.s.i.g., in the portion 98a of the cylindrical member 98, notwithstanding an electrical or other failure of the controller 106, to thereby maintain a supply of hydraulic fluid to the cylinders 54 and 56 to make-up for leakage losses. Because of this minimum oil pressure, the cylinders 54 and 56 can be designed for a continuing low level of oil leakage therefrom, back to the engine oil compartment, thus eliminating the need for an expensive zero leakage seal design in the cylinders. The make-up oil for the cylinders 54 and 56 to compensate for such continuing oil leakage comes from the portion 98a of the cylindrical member 98 by way of a small, internal passage 120 within the spool 100, from the portion 98a of the cylindrical member 98 to the annular space 104, from which it can flow to the cylinders 54 and 56 by way of the inlet line 82. A check valve 122 is placed in the internal passage 120 to block the flow of oil from the space 104 to the portion 98a of the cylindrical member 98. The elements of the embodiment of FIGS. 3-11 which correspond to the elements of the schematic hydraulic diagram of FIGS. 12-14, other than the cylinders 54 and 56, are identified by prime numerals, for example, the inlet line of the embodiment of FIGS. 3-11 which corresponds to the inlet line 82 of FIGS. 12-14 is identified by reference numeral 82'. In that regard, it is noted that the check valves 84' and 86' of the embodiment of FIGS. 3-11 are of the disc type, whereas the check valves 84 and 86 of FIGS. 12-14 are of the ball type, either type being acceptable.

The cylinders 54 and 56 are arranged to resist the positive and negative torque pulses in the camshaft 34 and are alternatively pressurized thereby, because every force is resisted by an equal and oppositely directed reaction force. Such cyclical pressurizing of the cylinders 54 and 56 is converted to hydraulic flow, and to a change in position of the sprocket 32 relative to the sprocket 30, by the controlled positioning of the spool 100 within the cylindrical member of the spool valve 92 and by the flow direction sensitivity of the check valves 84 and 86.

Referring to FIG. 12, the cylinder 54 is pressurized during positive torque pulses in the camshaft 34 and the cylinder 56 is pressurized during negative torque pulses. The position of the spool 100 allows hydraulic fluid to flow out of the retracting cylinder 54 (during a positive torque pulse), through the passage 88, the passage 94, and the cavity 104, the passage 82, the check valve 86 and the passage 90 into the extending cylinder 56. When the torque pulse becomes negative, the cylinder 56 is pressurized, but the fluid is not allowed to flow out of the cylinder 56 because the check valve 86 closes and blocks backflow through the passage 82 and the land 100b blocks fluid flow through the passage 96. Therefore, with the cylinder 54 being allowed to retract and the cylinder 56 only being allowed to extend, the variable camshaft timing mechanism causes the camshaft 34 to move in the retarded timing direction relative to the position of the crankshaft 22.

FIGS. 13 illustrates a condition in which the position of the camshaft 34 is advanced relative to the position of the crankshaft 22. The position of the spool 100 allows hydraulic fluid to flow out of the retracting cylinder 56 (during a negative torque pulse), through the passage 90, the passage 96, the cavity 104, the passage 82, the check valve 84 and the passage 88 into the extending cylinder 54. When the torque in the crankshaft 34 becomes positive, the cylinder 54 is pressurized, but the fluid is not allowed to flow out of the cylinder 54 because the check valve 84 is closed and blocks backflow through the passage 82 and the land 100a blocks fluid flow through passage 94. Therefore, with the cylinder 56 being allowed to retract and the cylinder 54 only being allowed to extend, the variable camshaft timing mechanism causes the camshaft 34 to move in the advanced timing direction relative to the position of the crankshaft 22.

FIG. 14 illustrates a condition in which the spool 100 is in the neutral position. The land 100b prevents hydraulic fluid from exiting the cylinder 56 by blocking the exit passage 96. The check valve 86 also prevents fluid from leaving the cylinder 56, but allows makeup fluid to flow into the cylinder 56 to compensate for any leakage. Similarly, the land 100a prevents hydraulic fluid from exiting the cylinder 54 by blocking the exit passage 94. The check valve 84 also prevents fluid from leaving the cylinder 54, but allows makeup fluid to flow into the cylinder 54 to compensate for any leakage. Thus, by preventing flow from both cylinders, which prevents the cylinders 54 and 56 from retracting, the camshaft is "locked" in a selected intermediate position of the camshaft 34 relative to the crankshaft 22.

As is illustrated in FIGS. 12 and 13, the spool valve 100 is in the fully open position, allowing the hydraulic fluid to flow at the maximum rate of change of the camshaft timing relative to the crankshaft. If desired, the spool valve 100 can be partially opened, allowing the hydraulic fluid to flow at a reduced rate, limiting the rate of change of camshaft timing. Therefore, camshaft timing position and the rate of change of camshaft timing position are controllable by the same valve.

Figure 15:
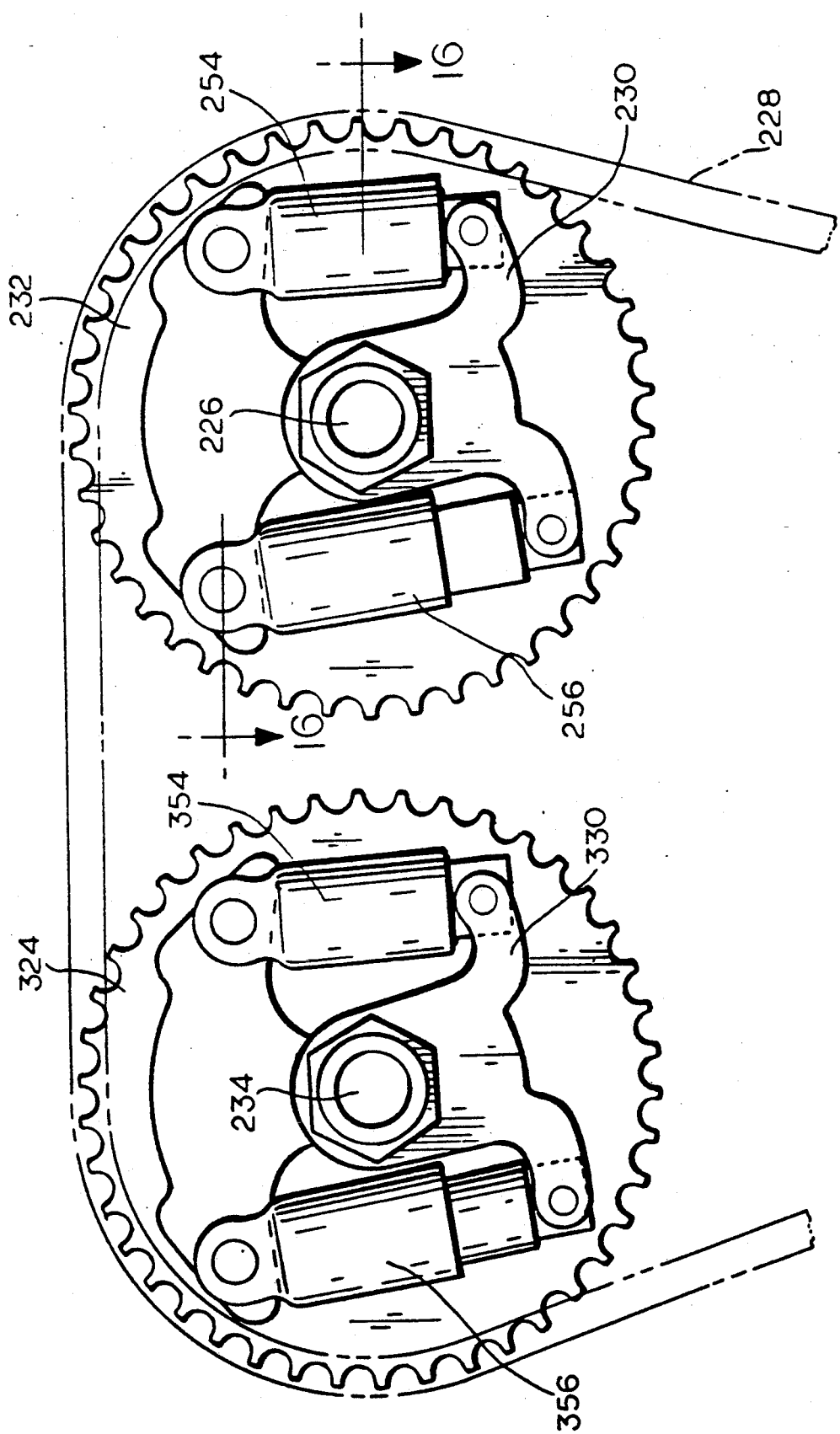
FIG. 15 is a fragmentary view of a dual camshaft internal combustion engine incorporating an alternative embodiment of the present invention.
Figure 16:
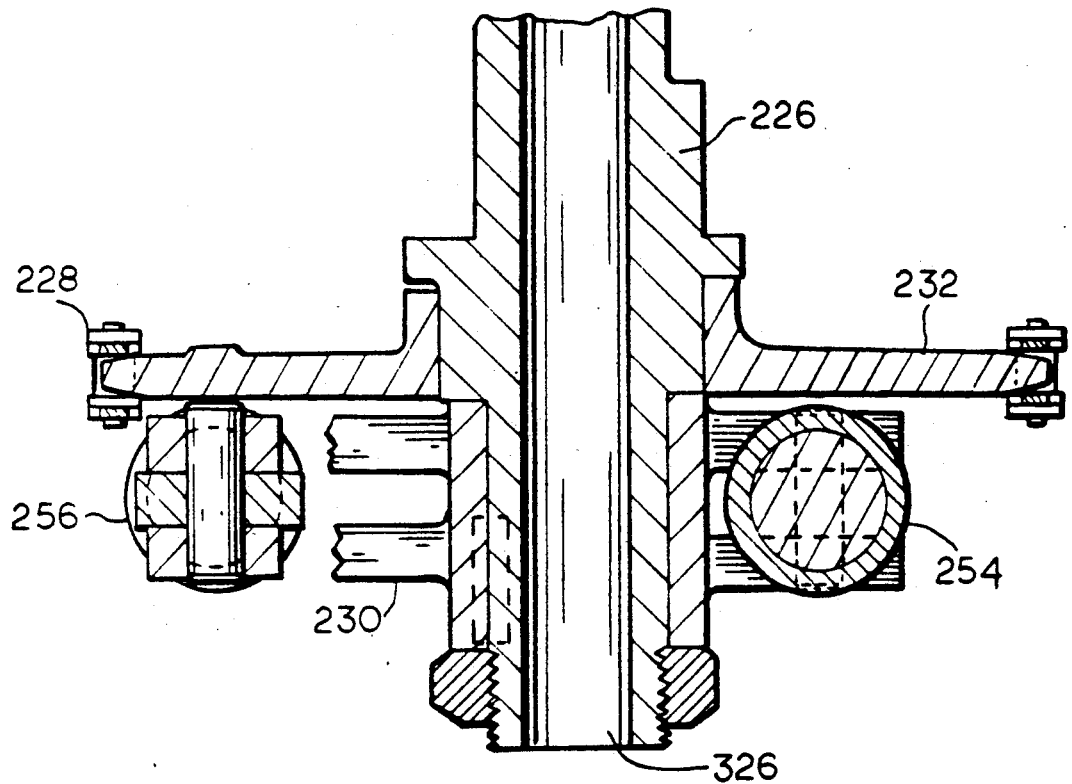
FIG. 16 is a sectional view taken on line 16—16 of FIG. 15.

FIGS. 15 and 16 illustrate schematically an embodiment of the present invention in which the principle of the embodiment of FIGS. 3-14 is adapted to the phasing of either or both of the camshafts of a dual camshaft engine relative to one another or relative to the crankshaft. In this embodiment a chain 228, which is shown fragmentarily and which is driven by a crankshaft, not shown, is trained both around a sprocket 232, which is journalled on an exhaust camshaft 226 to be oscillatable through a limited arc with respect thereto and to be otherwise rotatable therewith, and around a sprocket 324 which is similarly journalled on an intake camshaft 234. The body ends of single acting hydraulic cylinders 254 and 256 are pivotably attached to the sprocket 232, on opposite sides of the camshaft 226, and the piston ends of the cylinders 254 and 256 are controllably hydraulically interconnected as in the manner of the cylinders 54 and 56 of the embodiment of FIGS. 3-18. Thus, the extending of one or another of the cylinders 254 and 256, with the concurrent retracting of the other of such cylinders, will advance or retard, as the case may be, the position of the camshaft 226 relative to the crankshaft, not shown, which is driving the chain 228. Likewise, the body ends of single acting hydraulic cylinders 354 and 356 are pivotably attached to the sprocket 324, on opposite sides of the camshaft 234, and the piston ends of the cylinders 354 and 356 are pivotably attached to a bracket 330 which is keyed to the camshaft 234. The cylinders 354 and 356 are controllably hydraulically interconnected in the manner of the cylinders 54 and 56 of the embodiment of FIGS. 3-14, to operate in unison with, or independently of, the cylinders 254 and 256. Thus, the extending of one or another of the cylinders 354 and 356, with the concurrent retracting of the other of such cylinders, will advance or retard, as the case may be, the position of the camshaft 234 relative to the crankshaft. Depending on the manner of controlling the actuation of the cylinders 254 and 256, on the one hand, and the cylinders 354 and 356, on the other hand, the advancing and retarding of the camshaft 234 will be in unison with, or independent of, the advancing and retarding of the camshaft 226. The hydraulic system for the embodiment of FIGS. 15 and 16 is not shown in such figures, but it is to be understood it is the same as the hydraulic system of FIGS. 3-14.

Figure 17:
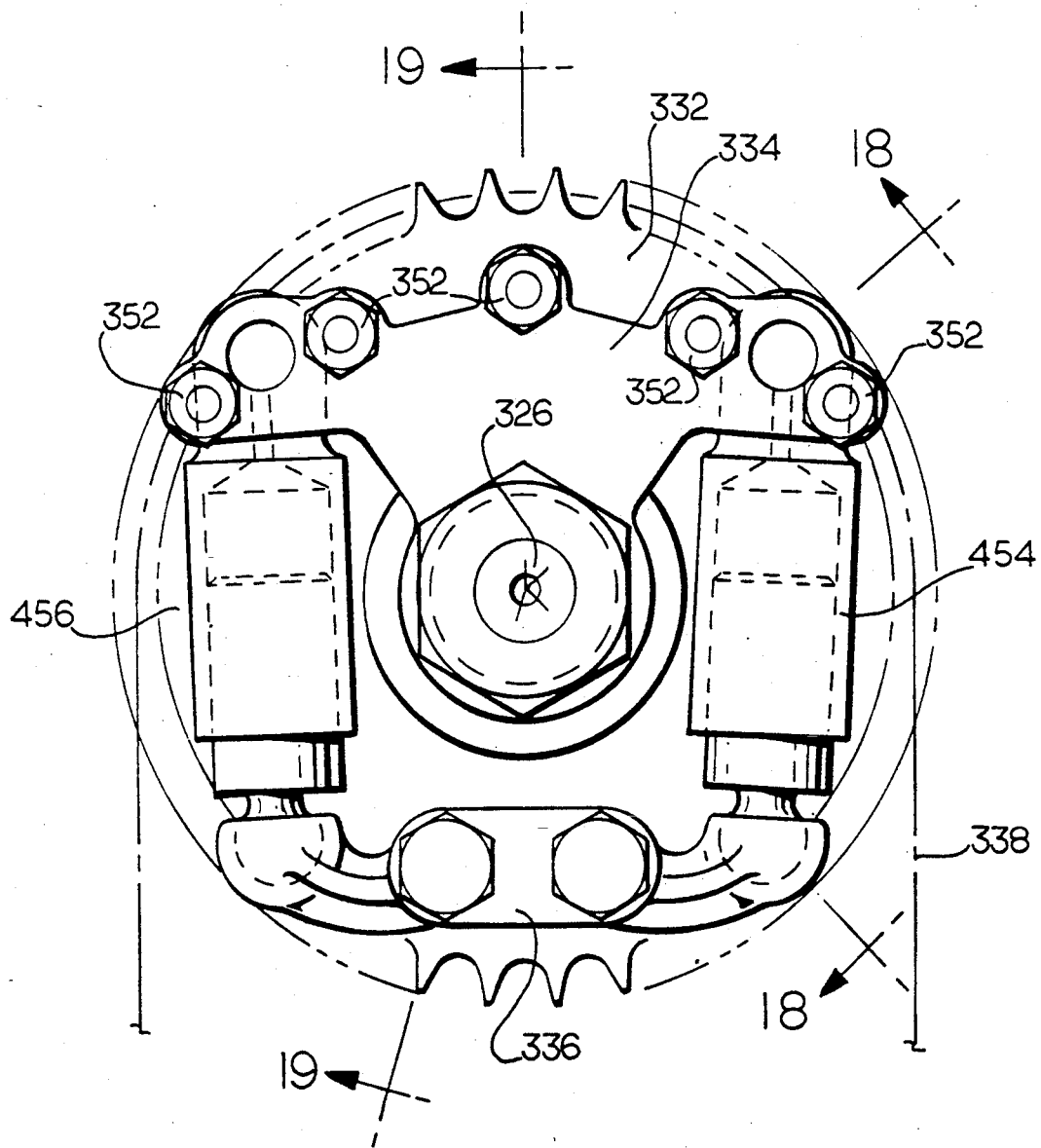
FIG. 17 is a fragmentary view illustrating the application of the variable camshaft timing system of the present invention to a single camshaft engine.
Figure 19:
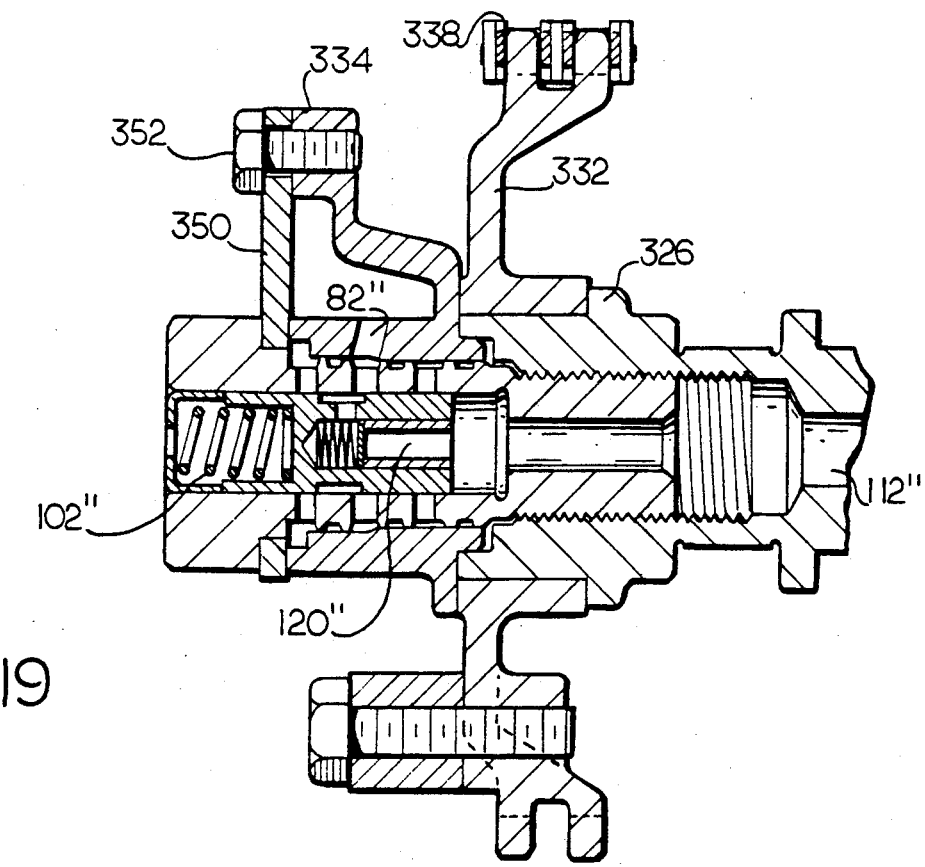
FIG. 19 is a sectional view taken on line 19—19 of FIG. 17.
Figure 18:
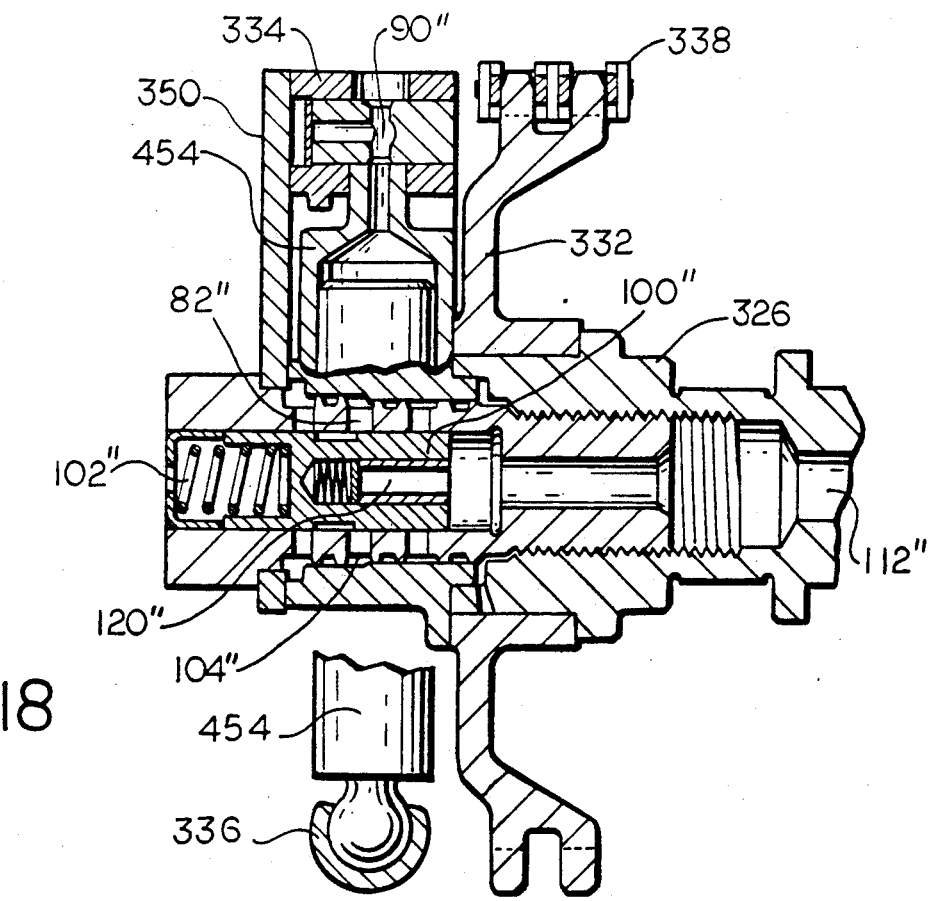
FIG. 18 is a sectional view taken on line 18—18 of FIG. 17.
Figure 20:
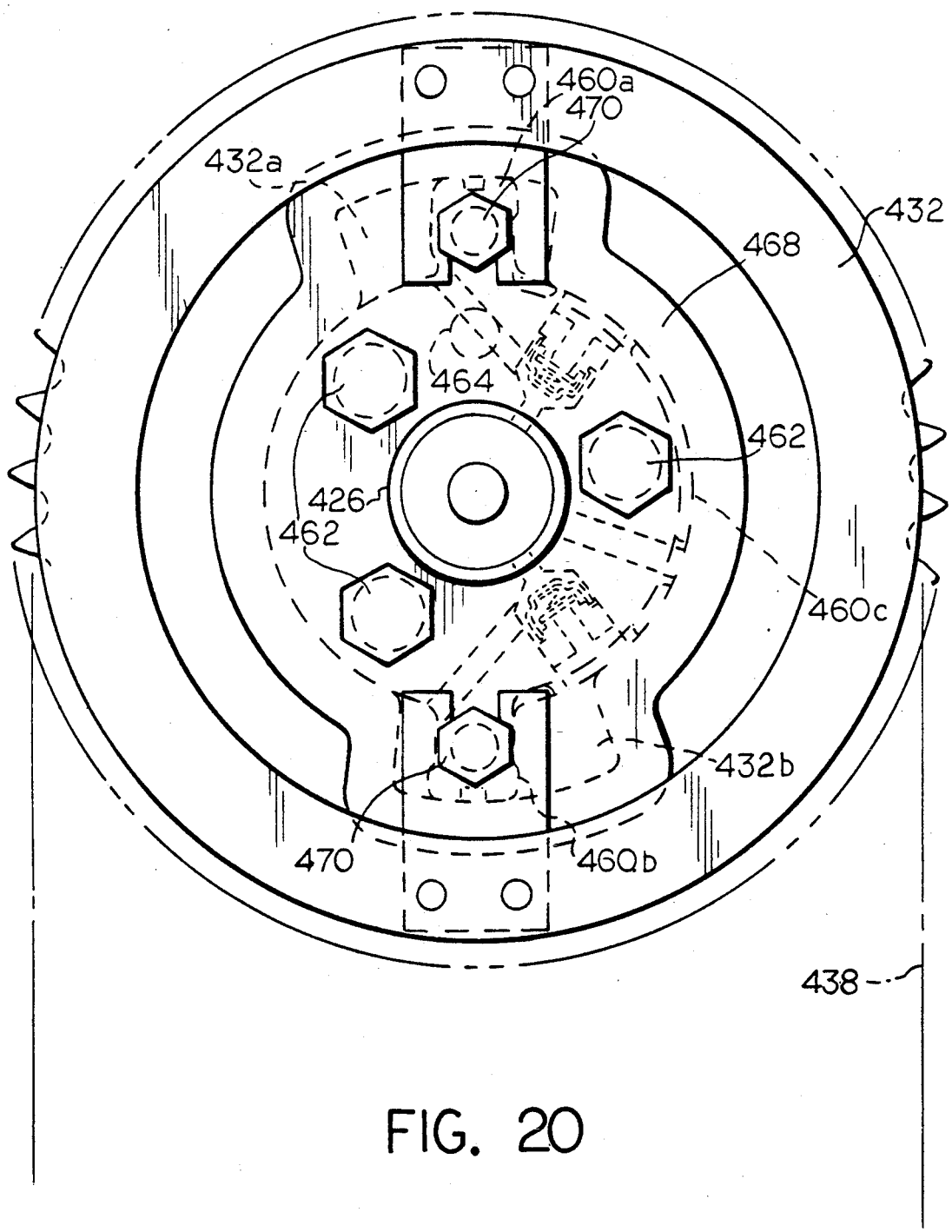
FIG. 20 is an end elevational view of a camshaft with an alternative embodiment of a variable camshaft timing system applied thereto.
Figure 21:
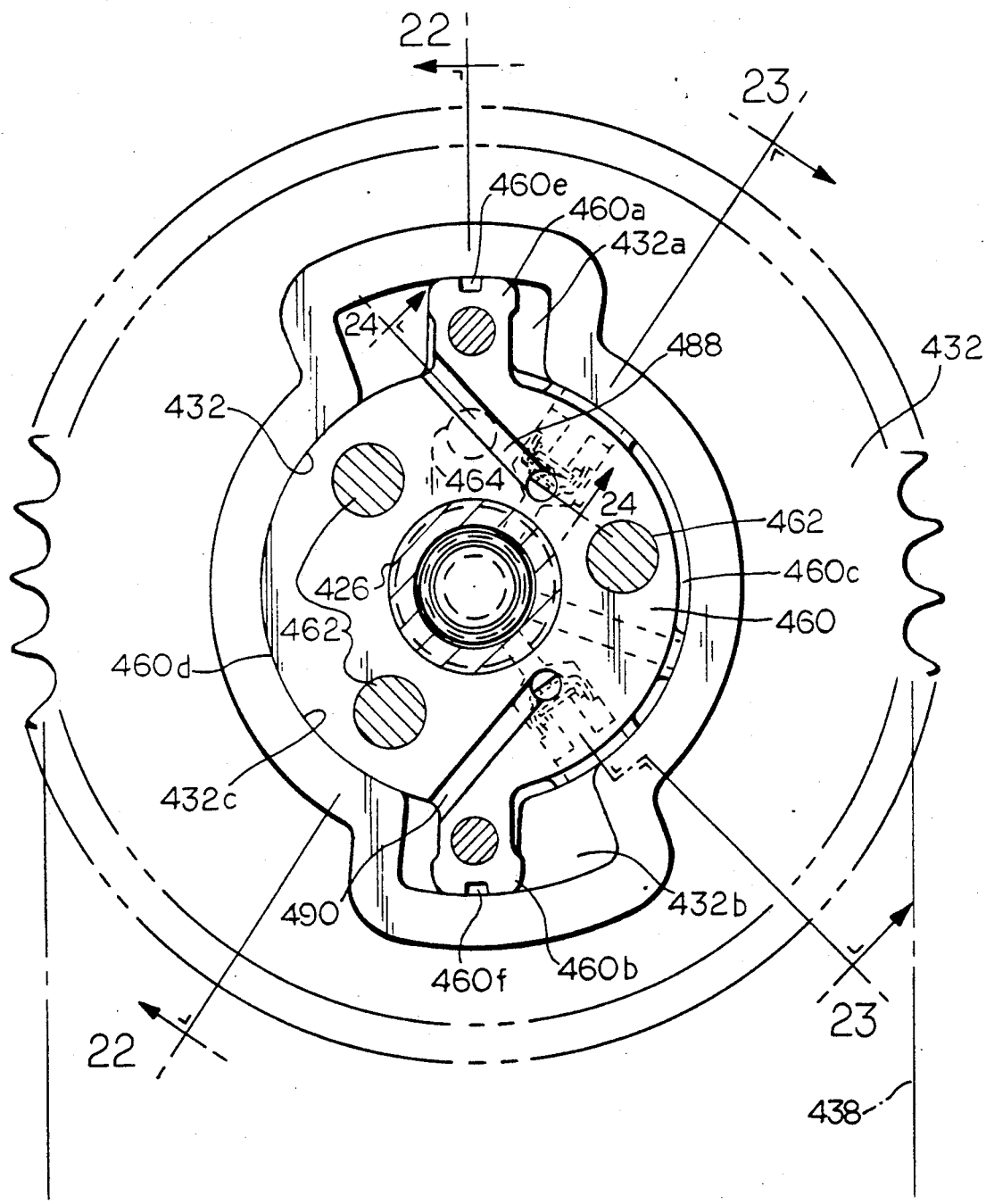
FIG. 21 is a view similar to FIG. 20 with a portion of the structure thereof removed to more clearly illustrate other portions thereof.

FIGS. 17-19 illustrate schematically an embodiment of the present invention in which the principle of the embodiments of FIGS. 3-14 and FIGS. 15-16 is adapted to the phasing of a single camshaft of an engine relative to the crankshaft of the engine. While FIGS. 17-19 illustrate an engine of the overhead camshaft type, it is to be understood that the principle of FIGS. 17-19 is also applicable to a single camshaft engine of the in block camshaft type.

In the embodiment of FIGS. 17-19, an endless chain 338, only the centerline of which is shown, is driven by a crankshaft, not shown, and is trained around a sprocket 332. The sprocket 332 is journalled on a camshaft 326 and is oscillatable through a limited arc with respect to the camshaft 326 and is rotatable therewith. The body ends of single acting hydraulic cylinders 454 and 456 are pivotably attached to a hydraulic body 334, which is keyed to the camshaft 326, and the piston ends of the cylinders 454 and 456 are pivotably attached to the bracket 336 which is attached to the sprocket 332. The hydraulic body 334 has internal, hydraulic fluid flow passages therein, similar to the hydraulic body 334 of the embodiment of FIGS. 3-14, and is covered by a cover plate 350 which is bolted to the hydraulic body 334 by bolts 352. The hydraulic system for the embodiment of FIGS. 17-19 is the same as the hydraulic system of FIGS. 3-14, and the elements of the embodiment of FIGS. 17-19 which correspond to the elements of the schematic hydraulic diagram, other than the cylinders 454 and 456, are identified by double prime numerals. For example, the inlet line of the embodiment of FIGS. 18 and 19 is identified by reference numeral 82''.

In the operation of the embodiment of FIGS. 17-19, torque pulsations in the camshaft 326 are experienced by the hydraulic body 334 by virtue of its keyed attachment to the camshaft, and these torque pulsations tend to advance or retard the circumferential position of the body 334 relative to the sprocket 332 which is insulated from the effect of the torque pulsations by virtue of being oscillatingly mounted on the camshaft 326. The actual advancing or retarding of the circumferential position of the hydraulic body 334 relative to the sprocket 332 in reaction to the torque pulsations in the camshaft 326, as heretofore explained, and, therefore, the advancing or retarding of the circumferential position of the camshaft 326 relative to that of the crankshaft, is permitted or prevented by the hydraulic system for the cylinders 454 and 456. At any given time, the control system, which is acting in response to a signal from an engine control unit, will permit flow from one of the cylinders 454 and 456, and it will prevent flow from the other of the cylinders 454 and 456, or it can prevent flow from both of the cylinders 454 and 456 to hold a given circumferential position of the hydraulic body 334.

FIGS. 20-31 illustrate an embodiment of the present invention in which a housing in the form of a sprocket 432 is oscillatingly journalled on a camshaft 426. The camshaft 426 may be considered to be the only camshaft of a single camshaft engine, either of the overhead camshaft type or the in block camshaft type. Alternatively, the camshaft 426 may be considered to be either the intake valve operating camshaft or the exhaust valve operating camshaft of a dual camshaft engine. In any case, the sprocket 432 and the camshaft 426 are rotatable together, and are caused to rotate by the application of torque to the sprocket 432 by an endless roller chain 438, shown fragmentarily, which is trained around the sprocket 432 and also around a crankshaft, not shown. As will be hereinafter described in greater detail, the sprocket 432 is oscillatingly journalled on the camshaft 426 so that it is oscillatable at least through a limited arc with respect to the camshaft 426 during the rotation of the camshaft, an action which will adjust the phase of the camshaft 426 relative to the crankshaft.

An annular pumping vane 460 is fixedly positioned on the camshaft 426, the vane 460 having a diametrically opposed pair of radially outwardly projecting lobes 460a, 460b and being attached to an enlarged end portion 426a of the camshaft by bolts 462 which pass through the vane 460 into the end portion 426a. In that regard, the camshaft 426 is also provided with a thrust shoulder 426b to permit the camshaft to be accurately positioned relative to an associated engine block, not shown. The pumping vane 460 is also precisely positioned relative to the end portion 426a by a dowel pin 464 which extend therebetween. The lobes 460a, 460b are received in radially outwardly projecting recesses 432a, 432b, respectively, of the sprocket 432, the circumferential extent of each of the recesses 432a, 432b being somewhat greater than the circumferential extent of the vane lobe 460a, 460b which is received in such recess to permit limited oscillating movement of the sprocket 432 relative to the vane 460. The recesses 432a, 432b are closed around the lobes 460a, 460b, respectively, by spaced apart, transversely extending annular plates 466, 468 which are fixed relative to the vane 460, and, thus, relative to the camshaft 460, by bolts 470 which extend from one to the other through the same lobe, 460a or 460b. Further, the inside diameter 432c of the sprocket 432 is sealed with respect to the outside diameter of the portion 460d of the vane 460 which is between the lobe 460a, 460b, and the tips of the lobes 460a, 460b of the vane 460 are provided with seal receiving slots 460e, 460f, respectively. Thus each of the recesses 432a, 432b of the sprocket 432 is capable of sustaining hydraulic pressure, and within each recess 432a, 432b, the portion on each side of the lobe 460a, 460b, respectively, is capable of sustaining hydraulic pressure.

Figure 29:
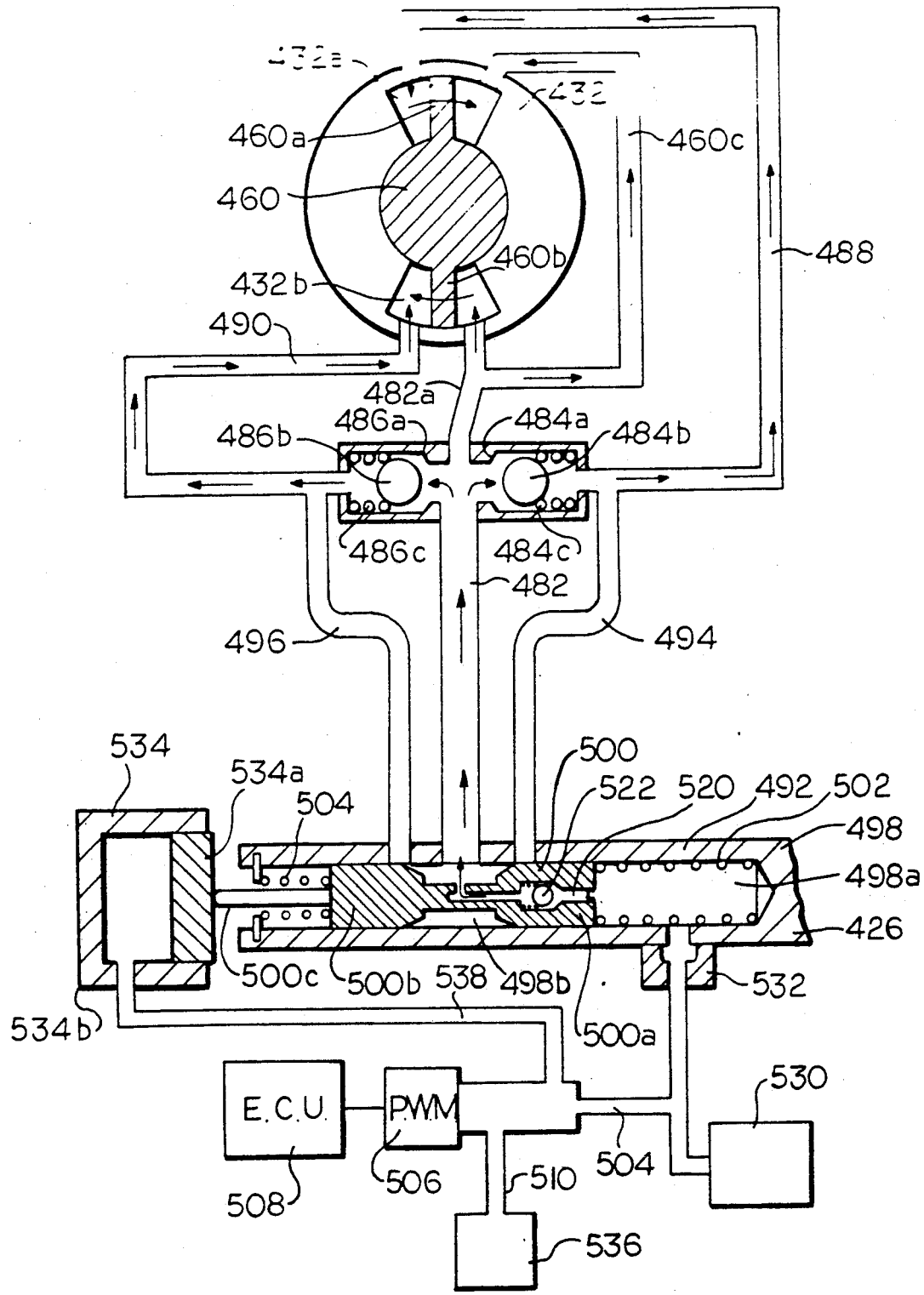
FIG. 29 is a simplified schematic view of the variable camshaft timing arrangement of FIGS. 20-28.

The functioning of the structure of the embodiment of FIGS. 20-28, as thus far described, may be understood by reference to FIG. 29. Hydraulic fluid, illustratively in the form of engine lubricating oil, flows into the recesses 432a, 432b by way of a common inlet line 482. The inlet line 482 terminates at a juncture between opposed check valves 484 and 486 which are connected to the recesses 432a, 432b, respectively, by branch lines 488, 490, respectively. The check valves 484, 486 have annular seats 484a, 486a, respectively, to permit the flow of hydraulic fluid through the check valves 484, 486 into the recesses 432a, 432b, respectively. The flow of hydraulic fluid through the check valves 484, 486, is blocked by floating balls 484b, 486b, respectively, which are resiliently urged against the seats 484a, 486a, respectively, by springs 484c, 486c, respectively. The check valves 484, 486, thus, permit the initial filling of the recesses 432a, 432b and provide for a continuous supply of make-up hydraulic fluid to compensate for leakage therefrom. Hydraulic fluid enters the line 482 by way of a spool valve 492, which is incorporated within the camshaft 426, and hydraulic fluid is returned to the spool valve 492 from the recesses 432a, 432b by return lines 494, 496, respectively.

The spool valve 492 is made up of a cylindrical member 498 and a spool 500 which is slidable to and fro within the member 498. The spool 500 has cylindrical lands 500a and 500b on opposed ends thereof, and the lands 500a and 500b, which fit snugly within the member 498, are positioned so that the land 500b will block the exit of hydraulic fluid from the return line 496, or the land 500a will block the exit of hydraulic fluid from the return line 494, or the lands 500a and 500b will block the exit of hydraulic fluid from both the return lines 494 and 496, as is shown in FIG. 29, where the camshaft 426 is being maintained in a selected intermediate position relative to the crankshaft of the associated engine.

The position of the spool 500 within the member 498 is influenced by an opposed pair of springs 502, 504 which act on the ends of the lands 500a, 500b, respectively. Thus, the spring 502 resiliently urges the spool 500 to the left, in the orientation illustrated in FIG. 29, and the spring 504 resiliently urges the spool 500 to the right in such orientation. The position of the spool 500 within the member 498 is further influenced by a supply of pressurized hydraulic fluid within a portion 498a of the member 498, on the outside of the land 500a, which urges the spool 500 to the left. The portion 498a of the member 498 receives its pressurized fluid (engine oil) directly from the main oil gallery ("MOG") 530 of the engine, and this oil is also used to lubricate a bearing 532 in which the camshaft 426 of the engine rotates.

The control of the position of the spool 500 within the member 498 is in response to hydraulic pressure within a control pressure cylinder 534 whose piston 534a bears against an extension 500c of the spool 500. The surface area of the piston 534a is greater than the surface area of the end of the spool 500 which is exposed to hydraulic pressure within the portion 498, and is preferably twice as great. Thus, the hydraulic pressures which act in opposite directions on the spool 500 will be in balance when the pressure within the cylinder 534 is one-half that of the pressure within the portion 498a. This facilitates the control of the position of the spool 500 in that, if the springs 502 and 504 are balanced, the spool 500 will remain in its null or centered position, as illustrated in FIG. 29, with less than full engine oil pressure in the cylinder 534, thus allowing the spool 500 to be moved in either direction by increasing or decreasing the pressure in the cylinder 534, as the case may be.

The pressure within the cylinder 534 is controlled by a solenoid 506, preferably of the pulse width modulated type (PWM), in response to a control signal from an electronic engine control unit (ECU) 508, shown schematically, which may be of conventional construction.

Figure 22:
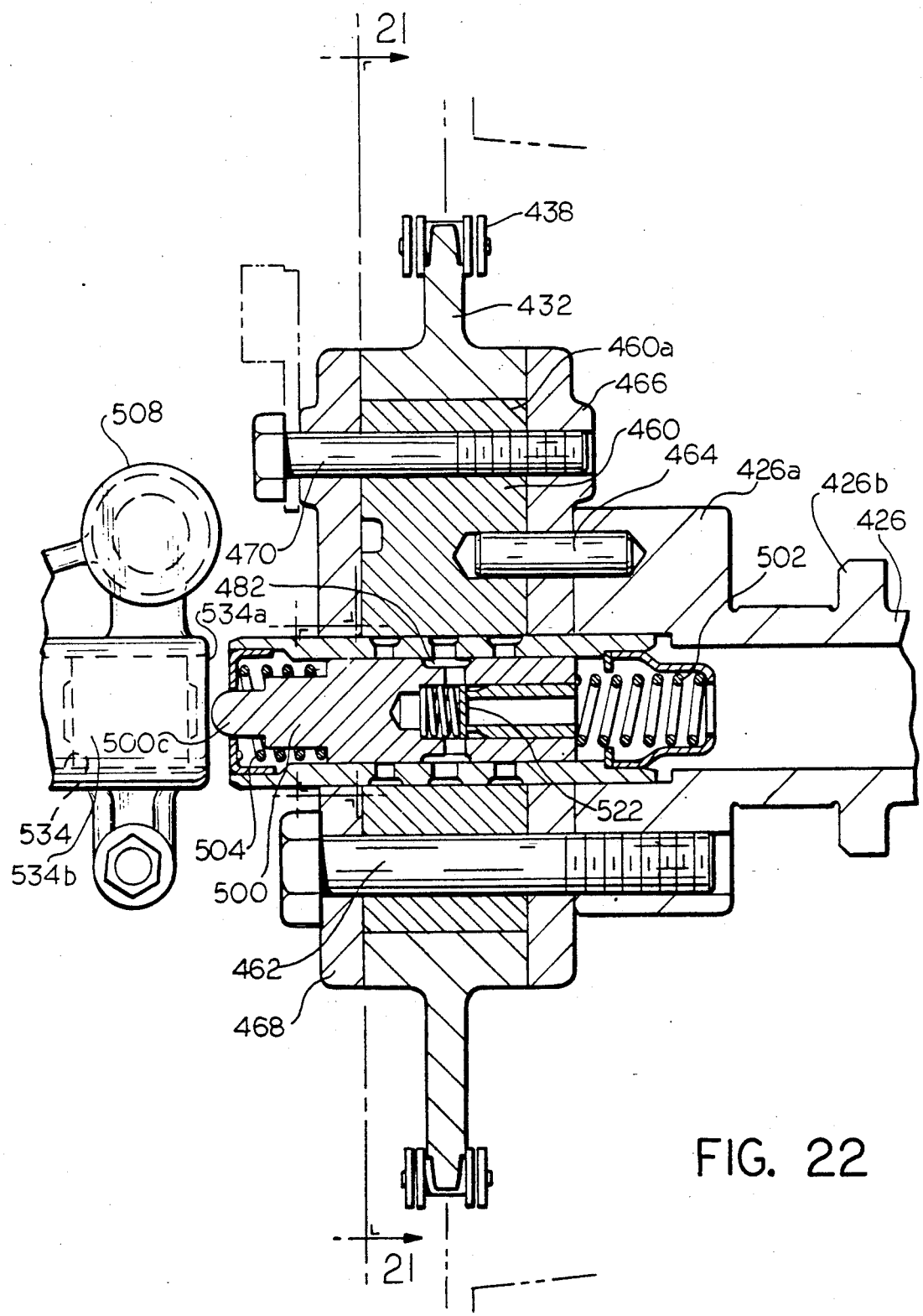
FIG. 22 is a sectional view taken on line 2213 22 of FIG. 21.
Figure 23:
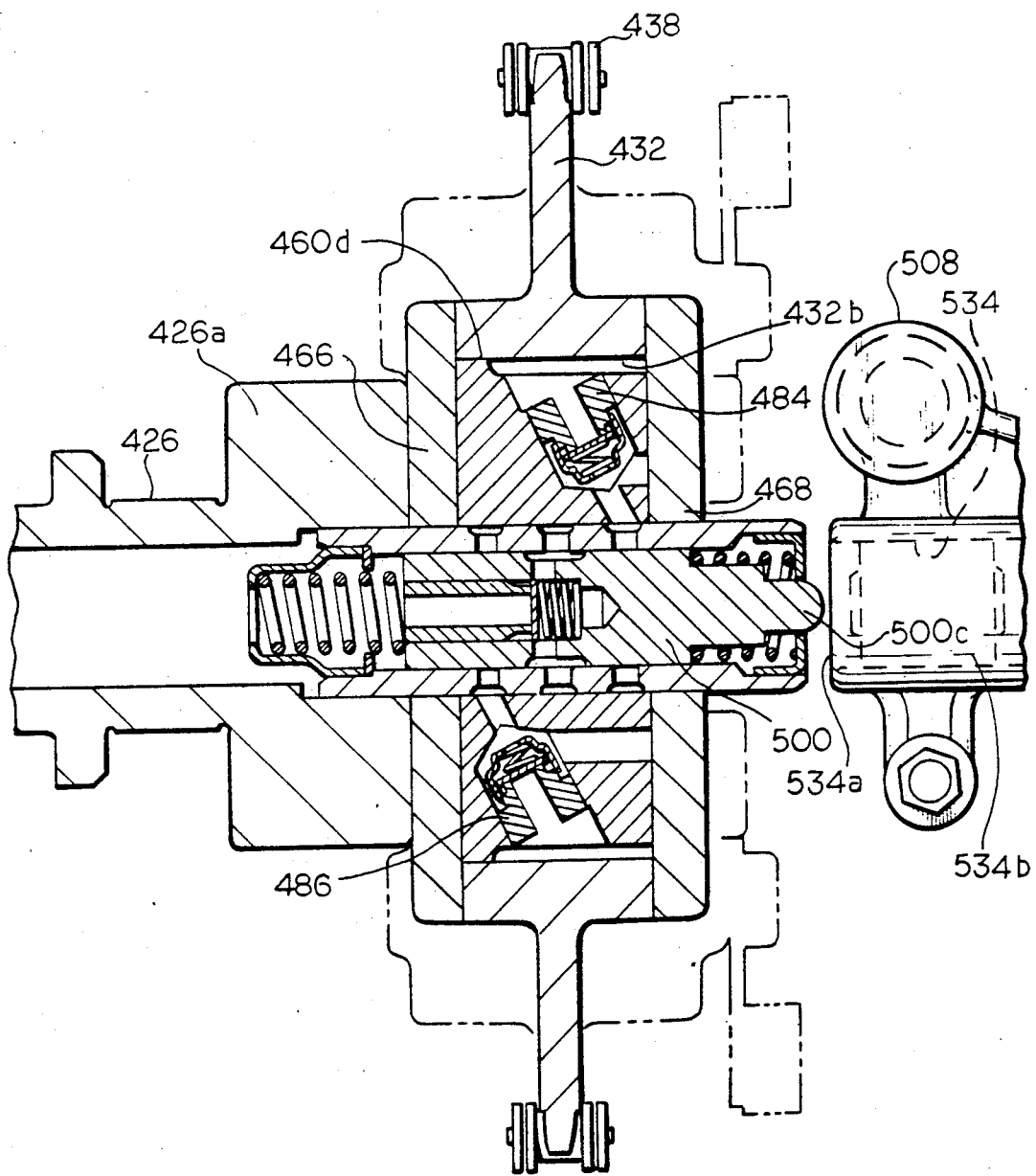
FIG. 23 is a sectional view taken on line 23—23 of FIG. 21.
Figures 25, 26:
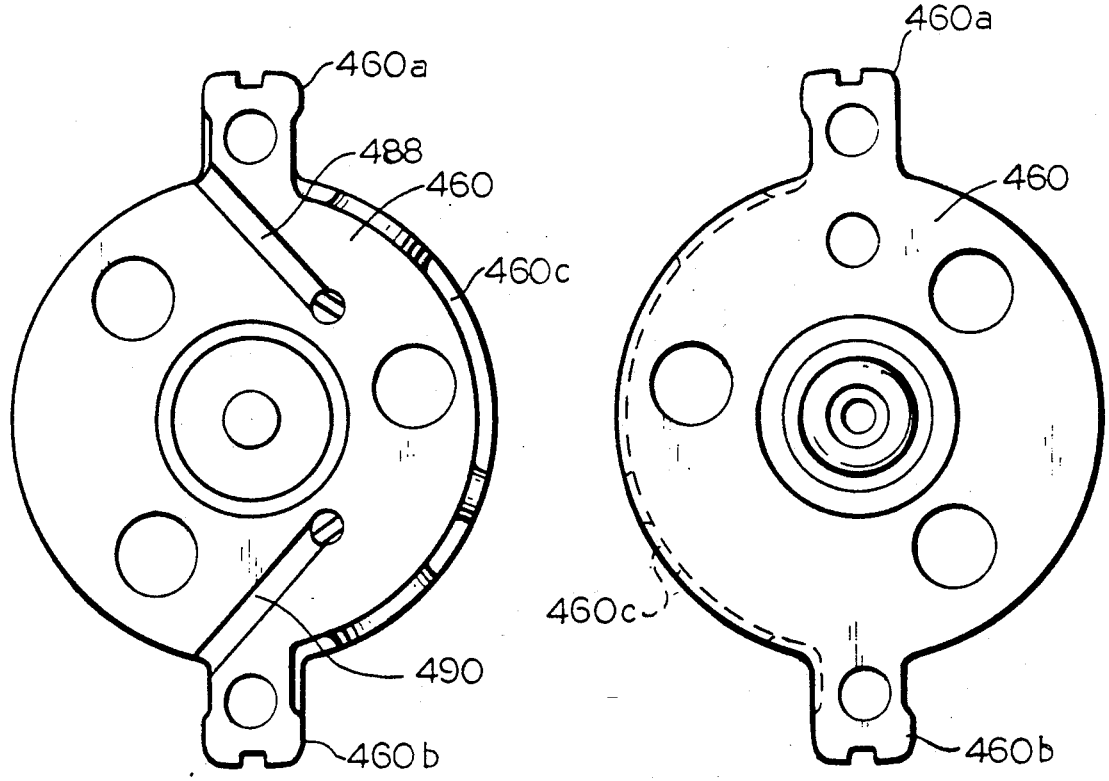
FIG. 25 is an end elevational view of an element of the variable camshaft timing system of FIGS. 20-24.
FIG. 26 is an elevational view of the element of FIG. 25 from the opposite end thereof.
Figure 24:
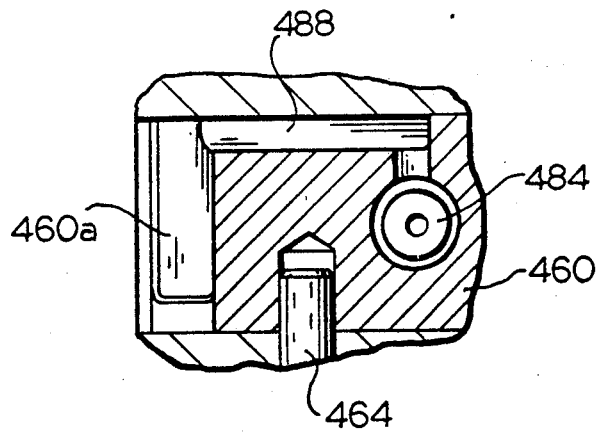
FIG. 24 is a sectional view taken on line 24—24 of FIG. 21.
Figure 27:
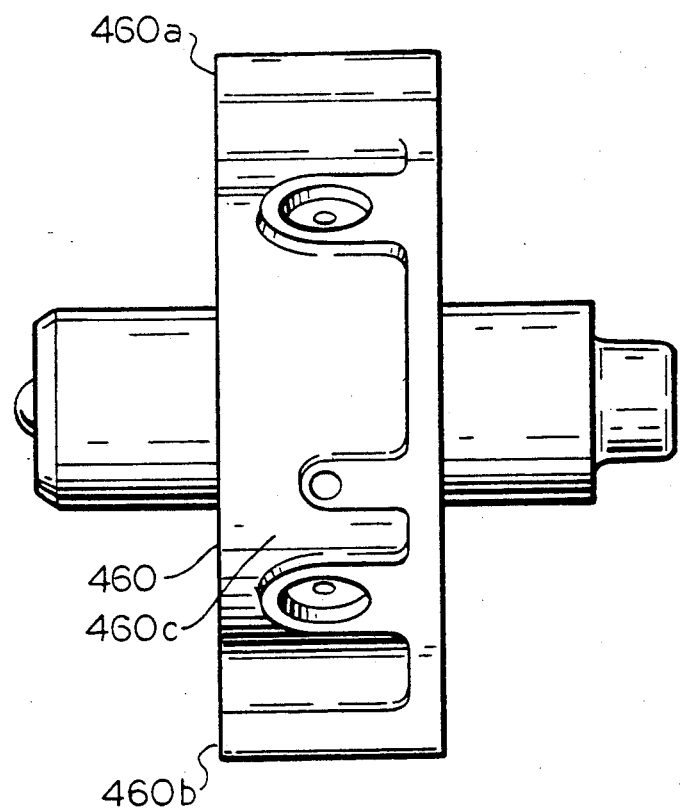
FIG. 27 is a side elevational view of the element of FIGS. 25 and 26.
Figure 28:
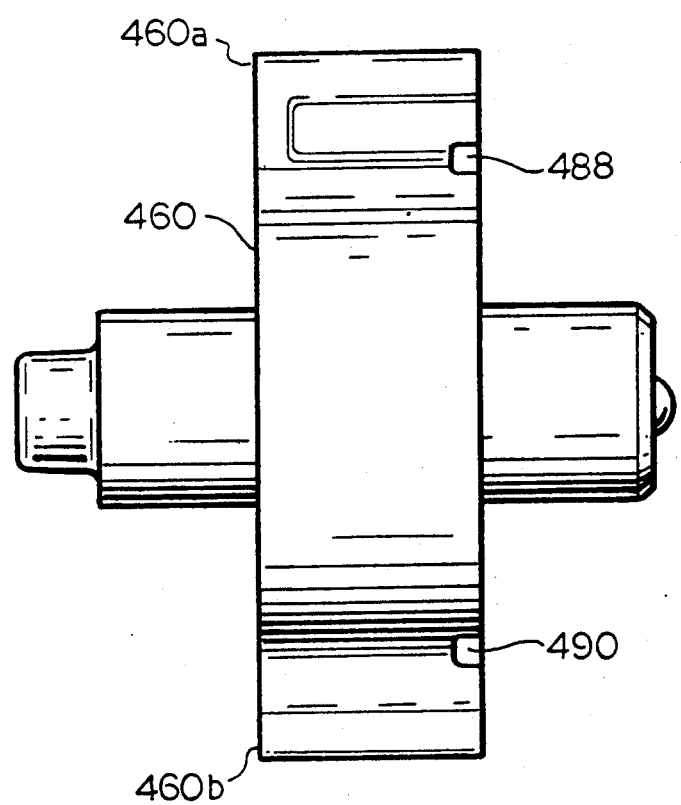
FIG. 28 is an elevational view of the element of FIG. 27 from the opposite side thereof.

With the spool 500 in its null position when the pressure in the cylinder 534 is equal to one-half the pressure in the portion 498a, as heretofore described, the on-off pulses of the solenoid 506 will be of equal duration; by increasing or decreasing the on duration relative to the off duration, the pressure in the cylinder 534 will be increased or decreased relative to such one-half level, thereby moving the spool 500 to the right or to the left, respectively. The solenoid 506 receives engine oil from the engine oil gallery 530 through an inlet line 504 and selectively delivers engine oil from such source to the cylinder 534 through a supply line 538. As is shown in FIGS. 22 and 23, the cylinder 534 may be mounted at an exposed end of the camshaft 426 so that the piston 534a bears against an exposed free end 500c of the spool 500. In this case, the solenoid 508 is preferably mounted in a housing 534b which also houses the cylinder 534a.

Make-up oil for the recesses 432a, 432b of the sprocket 432 to compensate for leakage therefrom is provided by way of a small, internal passage 520 within the spool 500, from the passage 498a to an annular space 498b of the cylindrical member 498, from which it can flow into the inlet line 482. A check valve 522 is positioned within the passage 520 to block the flow of oil from the annular space 498b to the portion 498a of the cylindrical member 498.

The vane 460 is alternatingly urged in clockwise and counterclockwise directions by the torque pulsations in the camshaft 426 and these torque pulsations tend to oscillate the vane 460, and, thus, the camshaft 426, relative to the sprocket 432. However, in the FIG. 29 position of the spool 500 within the cylindrical member 498, such oscillation is prevented by the hydraulic fluid within the recesses 432a, 432b of the sprocket 432 on opposite sides of the lobes 460a, 460b, respectively, of the vane 460, because no hydraulic fluid can leave either of the recesses 432a, 432b, since both return lines 494, 496 are blocked by the position of the spool 500, in the FIG. 29 condition of the system. If, for example, it is desired to permit the camshaft 426 and vane 460 to move in a counterclockwise direction with respect to the sprocket 432, it is only necessary to increase the pressure within the cylinder 434 to a level greater than one-half that in the portion 498a of the cylindrical member. This will urge the spool 500 to the right and thereby unblock the return line 494. In this condition of the apparatus, counterclockwise torque pulsations in the camshaft 426 will pump fluid out of the portion of the recess 432a and allow the lobe 462a of vane 460 to move into the portion of the recess which has been emptied of hydraulic fluid. However, reverse movement of the vane will not occur as the torque pulsations in the camshaft become oppositely directed unless and until the spool 500 moves to the left, because of the blockage of fluid flow through the return line 496 by the land 500b of the spool 500. While illustrated as a separate closed passage in FIG. 29, the periphery of the vane 460 has an open oil passage slot, element 460c in FIGS. 20, 21, 25, 26 and 27, which permits the transfer of oil between the portion of the recess 432a on the right side of the lobe 460a and the portion of the recess 432b on the right side of the lobe 460b, which are the non-active sides of the lobes 460a, 460b; thus, counterclockwise movement of the vane 460 relative to the sprocket 432 will occur when flow is permitted through return line 494 and clockwise movement will occur when flow is permitted through return line 496.

Further, the passage 482 is provided with an extension 482a to the non-active side of one of the lobes 460a, 460b, shown as the lobe 460b, to permit a continuous supply of make-up oil to the non-active sides of the lobes 460a, 460b for better rotational balance, improved damping of vane motion, and improved lubrication of the bearing surfaces of the vane 460.

The elements of the structure of FIGS. 20-28 which correspond to the elements of FIG. 29, as described above, are identified in FIGS. 20-28 by the reference numerals which were used in FIG. 29, it being noted that the check valves 484 and 486 are disc-type check valves in FIGS. 20-28 as opposed to the ball type check valves of FIG. 29. While disc-type check valves are preferred for the embodiment of FIGS. 20-28, it is to be understood that other types of check valves can also be used.

Although the best mode contemplated by the inventors for carrying out the present invention as of the filing date hereof has been shown and described herein, it will be apparent to those skilled in the art that suitable modifications, variations, and equivalents may be made without departing from the scope of the invention, such scope being limited solely by the terms of the following claims.

What is claimed is:

1. In an internal combustion engine having a rotatable crankshaft and a rotatable camshaft, the camshaft being position variable relative to the crankshaft, being subject to torque reversals during the rotation thereof, having a vane with at least one lobe secured to the camshaft for rotation therewith, and having a housing mounted on the camshaft for rotation with the camshaft and for oscillation with respect to the camshaft, the housing having at least one recess receiving the at least one lobe of the vane and permitting oscillation of the at least one lobe within the at least one recess as the housing oscillates with respect to the camshaft, the engine further having means for transmitting rotational movement from the crankshaft to the housing and means for varying the position of the housing relative to the camshaft, the method comprising:

actuating the means for varying the position of the housing relative to the camshaft in reaction to torque reversals in the camshaft.

2. In an internal combustion engine having a rotatable crankshaft and a rotatable camshaft, the camshaft being position variable relative to the crankshaft and being subject to torque reversals during the operation thereof, the method comprising:

providing the camshaft with a vane having at least one lobe, the vane being rotatable with the camshaft and being non-oscillatable with respect to the camshaft;

providing the camshaft with a housing having at least one recess, the housing being rotatable with the camshaft and being oscillatable with respect to the camshaft, the at least one recess of the housing receiving the at least one lobe of the vane and permitting oscillation of the at least one lobe within the at least one recess as the housing oscillates with respect to the camshaft;

providing means for transmitting rotary movement from the crankshaft to the housing;

providing means for varying the position of the housing relative to the camshaft; and actuating the means for varying the position of the housing relative to the camshaft in reaction to torque reversals in the at least one camshaft.

3. The method according to claim 2 wherein the means for varying the position of the housing relative to the camshaft comprises means for permitting the position of the housing to move in a first direction relative to the camshaft in reaction to a torque pulse in the camshaft in a first direction, means for preventing the position of the housing from moving relative to the camshaft in a second direction in reaction to a torque pulse in the camshaft in a second direction, and means for selectively reversing the first and second directions of the movement of the housing relative to the camshaft with respect to the first and second directions of torque pulses in the camshaft.

4. The method according to claim 3 wherein the at least one recess is capable of sustaining hydraulic pressure, wherein the at least one lobe divides the at least one recess into a first portion and a second portion, and wherein the varying of the position of the housing relative to the camshaft comprises:
transferring hydraulic fluid into one of the first portion and the second portion of the recess.

5. The method according to claim 4 wherein the varying of the position of the housing relative to the camshaft further comprises;
simultaneously transferring hydraulic fluid out of the other of the first portion and the second portion of the recess.

6. The method according to claim 4 wherein the hydraulic fluid is engine lubricating oil from a main oil gallery of the engine.

7. An internal combustion engine comprising:
a crankshaft, said crankshaft being rotatable about an axis;
a camshaft, said camshaft being rotatable about a second axis, said second axis being parallel to said axis, said camshaft being subject to torque reversals during the rotation thereof;
a vane having at least one lobe, said vane being attached to said camshaft, being rotatable with said camshaft and being non-oscillatable with respect to said camshaft;
a housing, said housing being rotatable with said camshaft and being oscillatable with respect to said camshaft, said housing having at least one recess, said at least one recess receiving said at least one lobe, said at least one lobe being oscillatable within said at least one recess;
rotary movement transmitting means for transmitting rotary movement from the crankshaft to the housing; and
means reactive to torque reversals in the camshaft for varying the position of the housing relative to the camshaft.

8. An engine according to claim 7 wherein said means reactive to torque reversals comprises control means for permitting the housing to move in a first direction relative to the camshaft in reaction to a torque pulse in the camshaft in a first direction and for preventing the housing from moving in a second direction relative to the camshaft in reaction to a torque pulse in the camshaft in a second direction.

9. An engine according to claim 8 wherein said at least one lobe divides said at least one recess into a first portion and a second portion, and wherein said control means comprises means for transferring hydraulic fluid into one of said first portion and said second portion, said one of said first portion and said second portion of said at least one recess being capable of sustaining hydraulic pressure.

10. An engine according to claim 9 wherein said control means further comprises means for simultaneously transferring hydraulic fluid out of the other of said first portion and said second portion.

11. An engine according to claim 10 wherein each of said first portion and said second portion of said at least one recess is capable of sustaining hydraulic pressure, and wherein said control means is capable of being reversed to transfer hydraulic fluid out of said one of said first portion and said second portion and to transfer hydraulic fluid into said other of said first portion and said second portion, said engine further comprising:
an engine control unit responsive to at least one engine operating condition for selectively reversing the operation of said control means.

12. An engine according to claim 11 wherein said hydraulic fluid comprises engine lubricating oil, and further comprising:
conduit means for transferring engine lubricating oil from a portion of said engine to said control means; and
second conduit means for transferring engine lubricating oil from said control means to said portion of said engine.

13. An internal combustion engine comprising:
a crankshaft, said crankshaft being rotatable about an axis;
a camshaft, said camshaft being rotatable about a second axis, said second axis is being parallel to said axis, said camshaft being subject to torque reversals during the rotation thereof;
a vane having first and second circumferentially spaced apart lobes, said vane being attached to said camshaft, being rotatable with said camshaft and being non-oscillatable with respect to said camshaft;
a housing, said housing being rotatable with said camshaft and being oscillatable with respect to said camshaft, said housing having first and second circumferentially spaced apart recesses, each of said first and second recesses receiving one of said first and second lobes and permitting oscillating movement of said one of said first and second lobes therein;
rotary movement transmitting means for transmitting rotary movement from the crankshaft to the housing; and
means reactive to torque reversals in the camshaft for varying the position of the housing relative to the camshaft.

14. An engine according to claim 13 wherein said means reactive to torque reversals comprises control means for permitting the housing to move in a first direction relative to the camshaft in reaction to a torque pulse in the camshaft in a first direction and for preventing the housing from moving in a second direction relative to the camshaft in reaction to a torque pulse in the camshaft in a second direction.

15. An engine according to claim 14 wherein each of said first and second lobes respectively divides each of said first and second recesses into a first portion and a second portion, and wherein said control means comprises means for transferring hydraulic fluid into one of said first portion and said second portion of each of said first and second recesses, each of said one of said first portion and said second portion of said each of said first and second recesses being capable of sustaining hydraulic pressure.

16. An engine according to claim 15 wherein said control means comprises means for simultaneously transferring hydraulic fluid out of the other of said first portion and second portion of said each of said first and second recesses.

17. An engine according to claim 16 wherein each of said first portion and said second portion of each of said first and second recesses is capable of sustaining hydraulic pressure, and wherein said control means is capable of being reversed to transfer hydraulic fluid out of said one of said first portion and said second portion of said each of said first and second recesses and to transfer hydraulic fluid into said other of said first portion and said second portion of said each of said first and second recesses, said engine further comprising:
 an engine control unit responsive to at least one engine operating condition for selectively reversing the operation of said control means.

18. An engine according to claim 17 wherein said hydraulic fluid comprises engine lubricating oil, and further comprising:
 conduit means for transferring engine lubricating oil from a portion of said engine to said control means; and
 second conduit means for transferring engine lubricating oil from said control means to said portion of said engine.

19. An engine according to claim 17 and further comprising:
 passage means connecting one of said first portion and said second portion of one of said first recess and said second recess with one of said first portion and said second portion of the other of said second recess to permit hydraulic fluid to flow between said one of said first portion and said second portion of said one of said first recess and said second recess and said one of said first portion and said second portion of said other of said first recess and said second recess.

20. An engine according to claim 19 wherein said control means further comprises;
 a spool valve body;
 a spool, said spool being reciprocable within said body and having first and second spaced apart lands;
 first return line means extending from one of said first recess and said second recess to said valve body, one of said first and second lands blocking flow through said first return line in a first range of positions of said spool within said valve body and permitting flow through said first line in a second range of positions of said spool within said valve body;
 second return line means extending from the other of said first recess and said second recess to said valve body, the other of said first and second lands blocking flow through said second return line in said second range of positions of said spool within said valve body, permitting flow through said second return line in a first portion of said first range of positions of said spool within said valve body, and blocking flow through said second return line in a second portion of said first range of positions of said spool within said valve body; and
 inlet line means extending from said valve body to each of said first recess and said second recess, said inlet line means being positioned between said first land and said second land in each of said first range of positions and said second range of positions of said spool and permitting hydraulic fluid to flow from said valve body to said each of said first recess and said second recess regardless of the position of said spool, said inlet line means having check valve means for preventing the flow of hydraulic fluid from each of said first recess and said second recess to said valve body.

21. An engine according to claim 20 wherein at least one of said first and second lands of said spool has a passage extending therethrough, said passage providing communication for the flow of hydraulic fluid through said spool to said inlet line means, said passage having second check valve means for preventing the flow of hydraulic fluid from said inlet line means through said spool.

22. An engine according to claim 20 wherein said engine control means comprises means for reciprocating said spool within said valve body.

* * * * *

UNITED STATES PATENT AND TRADEMARK OFFICE
CERTIFICATE OF CORRECTION

PATENT NO.  : 5,107,804
DATED       : April 28, 1992
INVENTOR(S) : Thomas J. Becker et al.

It is certified that error appears in the above-identified patent and that said Letters Patent is hereby corrected as shown below:

Column  2, line 46, "o" should be --or--.

Column  4, line 33, "2213 22" should be --22-22 --.

Column  6, line 23, "a" should be --an--.

Column 11, line 31, after "camshaft" insert --426--.

Column 13, line 10, change "504" to --540--,
           line 41, after "and" insert --the--,
           line 49, change "the" ( first occurrence ) to --a--,
           line 50, change "462a" to --460a--.

Signed and Sealed this

Twelfth Day of April, 1994

Attest:

BRUCE LEHMAN

Attesting Officer

Commissioner of Patents and Trademarks